(12) United States Patent
Lee et al.

(10) Patent No.: US 12,413,658 B2
(45) Date of Patent: Sep. 9, 2025

(54) COVER FOR FOLDABLE ELECTRONIC DEVICE

(71) Applicant: SAMSUNG ELECTRONICS CO., LTD., Suwon-si (KR)

(72) Inventors: Dahyun Lee, Suwon-si (KR); Bosoon Kang, Suwon-si (KR); Namsu Kim, Suwon-si (KR); Junho Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 443 days.

(21) Appl. No.: 17/945,399

(22) Filed: Sep. 15, 2022

(65) Prior Publication Data
US 2023/0029701 A1 Feb. 2, 2023

Related U.S. Application Data

(63) Continuation of application No. PCT/KR2022/011181, filed on Jul. 29, 2022.

(30) Foreign Application Priority Data

Jul. 30, 2021 (KR) ........................ 10-2021-0100894

(51) Int. Cl.
*H04M 1/18* (2006.01)
*H04M 1/02* (2006.01)

(52) U.S. Cl.
CPC ......... *H04M 1/185* (2013.01); *H04M 1/0268* (2013.01)

(58) Field of Classification Search
CPC ............................ H04M 1/185; H04M 1/0268
See application file for complete search history.

(56) References Cited

U.S. PATENT DOCUMENTS

| | | |
|---|---|---|
| 8,428,664 B1 | 4/2013 | Wyers |
| 8,960,421 B1 | 2/2015 | Diebel |

(Continued)

FOREIGN PATENT DOCUMENTS

| | | |
|---|---|---|
| CN | 202941571 | 5/2013 |
| KR | 10-2007-0097363 | 10/2007 |

(Continued)

OTHER PUBLICATIONS

Search Report and Written Opinion dated Nov. 7, 2022 issued in International Patent Application No. PCT/KR2022/011181.

(Continued)

*Primary Examiner* — Justin Y Lee
(74) *Attorney, Agent, or Firm* — Nixon & Vanderhye P.C.

(57) ABSTRACT

According to an example embodiment of the disclosure, a cover for a foldable electronic device may include: a first cover including a first plate having a first surface and a second surface opposite to the first surface, and a first sidewall portion extending from an edge of the first plate, and having, based on the first plate and the first sidewall portion, a first recess allowing one part of the foldable electronic device with respect to a folding axis of the foldable electronic device to be disposed therein; a second cover including a second plate having a third surface and a fourth surface opposite to the third surface, and a second sidewall portion extending from an edge of the second plate, and having, based on the second plate and the second sidewall portion, a second recess allowing other part of the foldable electronic device with respect to the folding axis to be disposed therein; and a strap connecting the first cover and the second cover, the strap including a first portion combined with the first surface of the first cover; and a second portion extending from the first portion and passing through an opening part provided on the fourth surface of the (Continued)

second cover opposite to the third surface of the second cover.

20 Claims, 18 Drawing Sheets

(56) References Cited

U.S. PATENT DOCUMENTS

| | | | |
|---|---|---|---|
| 9,335,793 | B2 | 5/2016 | Rothkopf |
| 10,153,800 | B2 | 12/2018 | Hirsch |
| 10,463,126 | B2 | 11/2019 | Mallory et al. |
| 10,492,318 | B2 * | 11/2019 | Cavenagh ............. G06F 1/1647 |
| 10,610,004 | B1 | 4/2020 | Yeo |
| 10,694,837 | B1 | 6/2020 | Altschul et al. |
| 2007/0235492 | A1 * | 10/2007 | Sirichai .................. A45C 11/00 |
| | | | 224/675 |
| 2015/0201743 | A1 | 7/2015 | Erickson-Davis et al. |

FOREIGN PATENT DOCUMENTS

| | | |
|---|---|---|
| KR | 10-2017-0031782 | 3/2017 |
| KR | 10-1765766 | 8/2017 |
| KR | 10-1956481 | 3/2019 |
| KR | 10-1979629 | 5/2019 |
| WO | 2016/160603 | 10/2016 |

OTHER PUBLICATIONS

Extended Search Report dated Oct. 1, 2024 in European Patent Application No. 22849920.8.

* cited by examiner

COVER FOR FOLDABLE ELECTRONIC DEVICE

CROSS-REFERENCE TO RELATED APPLICATIONS

This application is a continuation of International Application No. PCT/KR2022/011181 designating the United States, filed on Jul. 29, 2022, in the Korean Intellectual Property Receiving Office and claiming priority to Korean Patent Application No. 10-2021-0100894, filed on Jul. 30, 2021, in the Korean Intellectual Property Office, the disclosures of which are incorporated by reference herein in their entireties.

BACKGROUND

Field

The disclosure relates to a cover for a foldable electronic device.

Description of Related Art

There is a cover that is attachable to and detachable from a foldable electronic device and can protect the foldable electronic device.

Required is a cover for a foldable electronic device that is not limited to protecting the foldable electronic device and can improve usability.

SUMMARY

Embodiments of the disclosure may provide a cover for a foldable electronic device capable of improving usability.

The technical problems to be addressed in the disclosure are not limited to the above-mentioned problems, and other technical problems not mentioned are clearly understood from the following description by a person skilled in the art to which the disclosure belongs.

According to an example embodiment of the disclosure, a cover for a foldable electronic device may include: a first cover including a first plate having a first surface and a second surface opposite to the first surface, and a first sidewall portion extending from an edge of the first plate, and having, based on the first plate and the first sidewall portion, a first recess allowing one part of the foldable electronic device with respect to a folding axis of the foldable electronic device to be disposed therein; a second cover including a second plate having a third surface and a fourth surface opposite to the third surface, and a second sidewall portion extending from an edge of the second plate, and having, based on the second plate and the second sidewall portion, a second recess allowing an other part of the foldable electronic device with respect to the folding axis to be disposed therein; and a strap connecting the first cover and the second cover, the strap including a first portion combined with the first surface included in surfaces providing the first recess; and a second portion extending from the first portion and passing through an opening part provided on the fourth surface opposite to the third surface included in surfaces providing the second recess.

The cover for the foldable electronic device according to various example embodiments of the disclosure can improve usability.

In addition, effects obtainable or predictable from various example embodiments of the disclosure will be explicitly or implicitly provided in the detailed description of the embodiments of the disclosure. For example, various effects according to various example embodiments of the disclosure will be described in the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
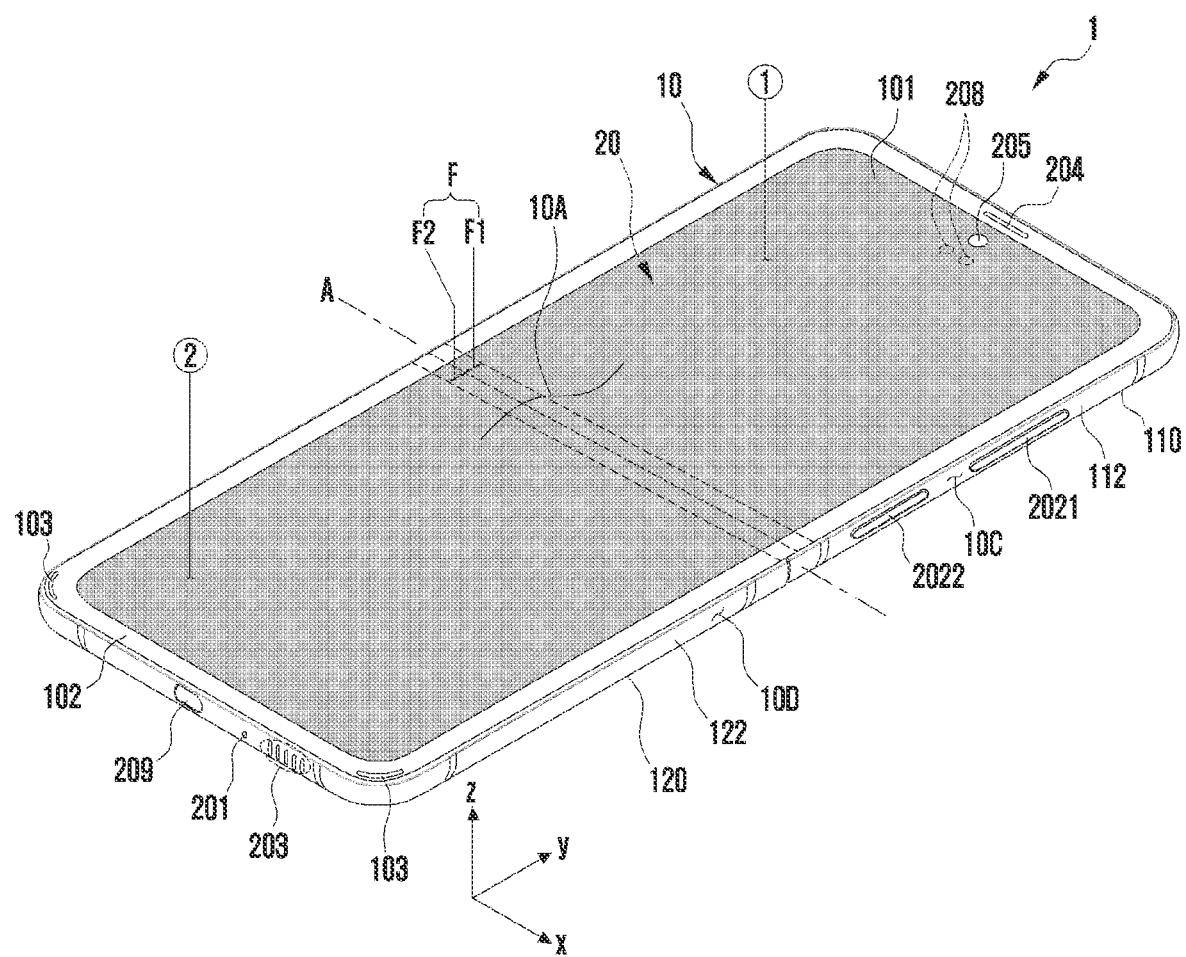
FIG. 1 is a front perspective view of a foldable electronic device in an unfolded state according to various embodiments.

Hereinafter, various example embodiments of the disclosure will be described in greater detail with reference to the accompanying drawings.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

Figure 2:
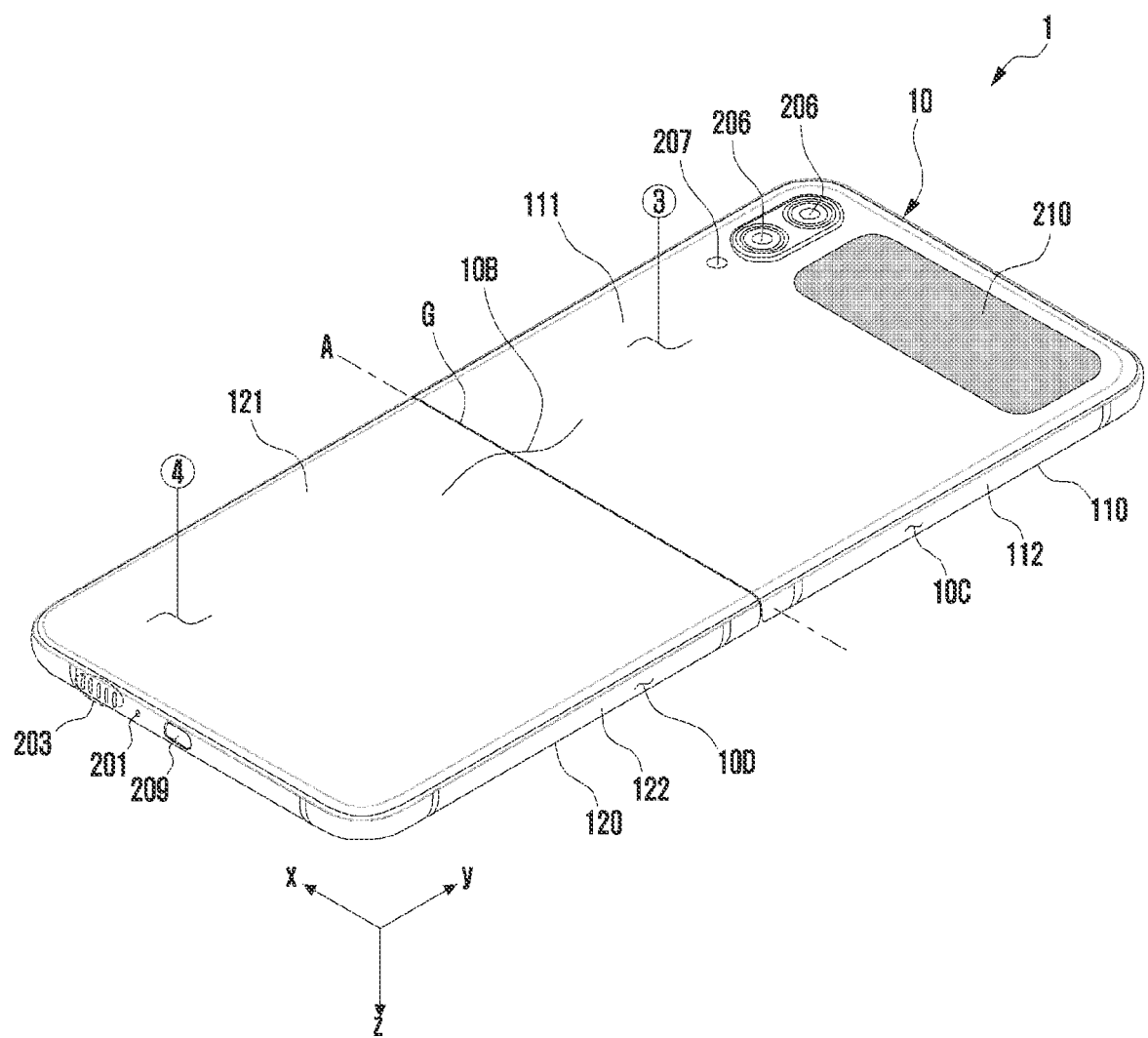
FIG. 2 is a rear perspective view of a foldable electronic device in an unfolded state according to various embodiments.
Figure 3:
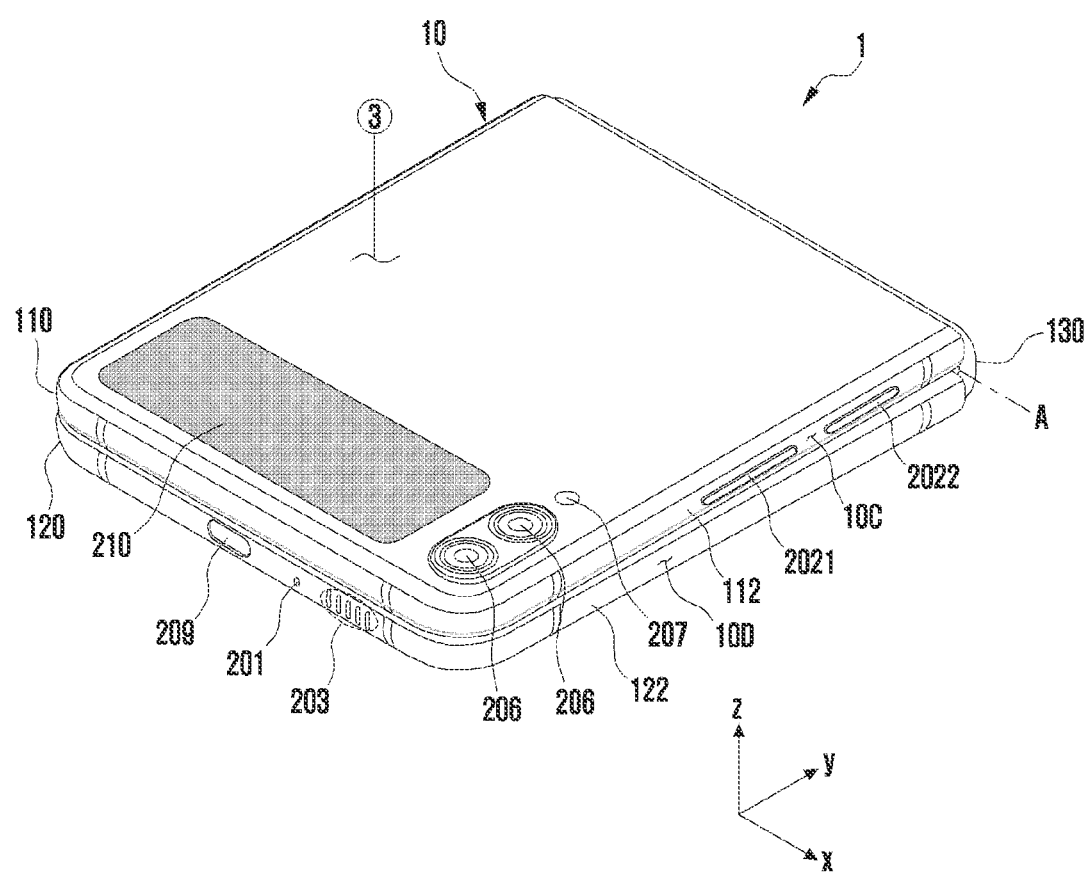
FIG. 3 is a perspective view of a foldable electronic device in a folded state according to various embodiments.

FIG. 1 is a front perspective view of a foldable electronic device 1 in an unfolded (or flat or unfolding) state according to various embodiments. FIG. 2 is a rear perspective view of a foldable electronic device 1 in an unfolded state according to various embodiments. FIG. 3 is a perspective view of a foldable electronic device 1 in a folded (or folding) state according to various embodiments.

With reference to FIGS. 1, 2, and 3, in an embodiment, the electronic device (or foldable electronic device) 1 may include a foldable housing 10. The foldable housing 10 may have a front surface 10A of the electronic device 1 and a rear surface 10B of the electronic device 1 positioned opposite to the front surface 10A. The foldable housing 10 may include a first side surface 10C and a second side surface 10D of the electronic device 1 that at least partially surround a space between the front surface 10A and the rear surface 10B. The front surface 10A may include a first cover area ①, a second cover area ②, and a folding cover area F between the first cover area ① and the second cover area ②. In the unfolded state of the foldable housing 10, the front surface 10A may be substantially planar, and the first cover area ①, the second cover area ②, and the folding cover area F may face in substantially the same direction. The rear surface 10B may include a third cover area ③ and a fourth cover area ④. The third cover area ③ is positioned opposite to the first cover area ① of the front surface 10A and may face in the opposite direction to the first cover area ①. The fourth cover area ④ is positioned opposite to the second cover area ② of the front surface 10A and may face in the opposite direction to the second cover area ②. In an embodiment, the foldable housing 10 may be implemented as an in-folding structure in which the front surface 10A is foldable inward. For example, in the unfolded state of the foldable housing 10 (see FIG. 1), the folding cover area F is flat, and the first cover area ① and the second cover area ② may form an angle of about 180 degrees. In the folded state of the foldable housing 10 (see FIG. 3), the folding cover area F is curved, and the first cover area ① and the second cover area ② may form an angle different from about 180 degrees. The folded state may include a fully folded state or an intermediate state. The fully folded state (see FIG. 3) is a state in which the first cover area ① and the second cover area ② of the front surface 10A are maximally folded so that they are no longer close. For example, the first cover area ① and the second cover area ② may form an angle of about 0 degrees to about 10 degrees. In the fully folded state, the front surface 10A may not be substantially exposed to the outside. The intermediate state may refer to a state between the unfolded state and the fully folded state. The folding cover area F of the front surface 10A may be more bent in the fully folded state than in the intermediate state.

According to an embodiment, the foldable housing 10 may include a front cover (e.g., a window) 101 providing at least a part of the front surface 10A. A flexible display 20 may be positioned in the internal space of the electronic device 1 by overlapping at least in part with the front cover 101. The front cover 101 may protect the flexible display 20 from the outside and may be substantially transparent. Light outputted from the flexible display 20 may pass through the front cover 101 and travel to the outside. The flexible display 20 may include, for example, a first display area (or active area) overlapped with the first cover area ① of the front surface 10A, a second display area overlapped with the second cover area ② of the front surface 10A, and a third display area overlapped with the folding cover area F. A screen may indicate an area in which an image can be expressed in the device including the flexible display 20 and the front cover 101, and it may include, for example, a display area of the flexible display 20 and a region of the front cover 101 overlapped therewith. In various embodiments, the front cover 101 may be provided integrally with the flexible display 20 as a component included in the flexible display 20. The front cover 101 may be implemented in the form of a thin layer such as a film to have flexibility. The front cover 101 may include, for example, a plastic film (e.g., polyimide film) or thin glass (e.g., ultra-thin glass (UTG)). In various embodiments, the front cover 101 may include a plurality of layers. For example, the front cover 101 may have a form in which a coating layer or protective layer of various polymer materials (e.g., polyester (PET), polyimide (PI), or thermoplastic polyurethane (TPU)) is disposed on a plastic film or thin glass.

According to an embodiment, the foldable housing 10 may include a first housing (or a first housing portion or a first housing structure) 110, a second housing (or a second housing portion or a second housing structure) 120, and/or a hinge structure (or a hinge assembly or a hinge portion) (not shown). The first housing 110 and the second housing 120 are connected by a hinge structure and may be mutually rotatable based on a folding axis A (e.g., a rotation axis of the hinge structure) of the foldable housing 10. The first housing 110 may include a first cover portion of the front cover 101 positioned on one side with respect to the folding axis A, a first rear cover 111 that provides at least a part of the third cover area ③ of the rear surface 10B, and a first side member (or a first side bezel structure, a first side portion, or a first sidewall portion) 112 that surrounds at least a part of a space between the first cover portion and the first rear cover 111 and provides the first side surface 10C. The first cover portion of the front cover 101 may provide, for example, the first cover area ① and a first folding cover area F1 of the folding cover area F located on one side with respect to the folding axis A. The second housing 120 may include a second cover portion of the front cover 101 positioned on one side with respect to the folding axis A, a second rear cover 121 that provides at least a part of the fourth cover area ④ of the rear surface 10B, and a second side member (or a second side bezel structure, a second side portion, or a second sidewall portion) 122 that surrounds at least a part of a space between the second cover portion and the second rear cover 121 and provides the second side surface 10D. The second cover portion of the front cover 101 may provide, for example, the second cover area ② and a second folding cover area F2 of the folding cover area F located on the other side with respect to the folding axis A. In the fully folded state of the foldable housing 10, the first side member 112 and the second side member 122 may be aligned at least partially overlapping with each other. The first side member 112 and/or the second side member 122 may be formed of, for example, ceramic, polymer, metal (e.g., aluminum, stainless steel, or magnesium), or a combination of at least two of the above materials. The first rear cover 111 and/or the second rear cover 121 may be substantially opaque. The first rear cover 111 and/or the second rear cover 121 may be formed of, for example, coated or colored glass, ceramic, polymer, metal (e.g., aluminum, stainless steel, or magnesium), or a combination of at least two of the above materials. In various embodiments, the first rear cover 111 and the first side member 112 may be provided integrally and may include the same material. In various embodiments, the second rear cover 121 and the second side member 122 may be provided integrally and may include the same material. In an embodiment, the hinge structure may include a hinge cover (or hinge housing) 130 (see FIG. 3). When switching from the unfolded state of FIG. 3 to the folded state of FIG. 2, a gap G between the first and second housings 110 and 120 is opened, and the hinge cover 130 may be exposed to the outside. In the folded state of FIG. 3, the hinge cover 130 may cover the inside of the electronic device 1 from being exposed from a side of the folding axis A. As shown in FIG. 2, in the unfolded state of the electronic device 1, the gap G may be substantially absent, and the hinge cover 130 may be hidden in the first and second housings 110 and 120 so as not to be exposed to the outside. Although not shown, in the intermediate state, the hinge cover 130 may be partially exposed between the first and second housings 110 and 120. The hinge cover 130 may be more exposed in the folded state of FIG. 3 than in the intermediate state.

According to various embodiments, the foldable housing 10 may refer to a structure (e.g., a foldable housing structure or a foldable housing assembly) that provides at least parts of the front surface 10A, the rear surface 10B, the first side surface 10C, and the second side surface 10D. For example, the foldable housing 10 may include a first housing portion, a second housing portion, and a folding portion connected to the first and second housing portions. The folding portion may refer to a portion more flexible than the first and second housing portions and may be bent in the folded state of the electronic device 1. The folding portion may have, for example, a structure (e.g., a multi-bar structure) in which a plurality of bars are arranged, but is not limited thereto. The folding portion may be implemented in various other structures having a bending characteristic while connecting the first and second housing portions.

According to an embodiment, the electronic device 1 may further include a cover member (or cover portion) 102 disposed on the front cover 101. The cover member 102 may be located around the screen of the front cover 101 along the edge of the front cover 101. The cover member 102 relieves an impact between the first and second housings 110 and 120 when the electronic device 1 is switched from the unfolded state of FIG. 1 to the folded state of FIG. 3, thereby reducing damage to the front cover 101. For example, when the electronic device 1 is switched from the unfolded state of FIG. 1 to the folded state of FIG. 3, a portion of the cover member 102 positioned on the first housing 110 and the other portion of the cover member 102 positioned on the second housing 120 come into contact with each other, and the first cover area ① and the second cover area ② of the front cover 101 may be positioned in close proximity without contact. The cover member 102 may contribute to aesthetics as a bezel surrounding the screen. In various embodiments, the cover member 102 may be omitted due to screen expansion or may be provided in another form such as a buffer member (or buffer) indicated by reference numeral 103.

According to an embodiment, the electronic device 1 may include an input module, a sound output module, a camera module, a sensor module, a connection terminal, or a sub-display 210. In various embodiments, the electronic device 1 may omit at least one (e.g., the sub-display 210) of the components or additionally include any other component.

The input module may include, for example, a microphone positioned inside the electronic device 1, and a microphone hole 201 provided on the second side surface 10D to correspond to the microphone. The position or number of the input module including the microphone and the corresponding microphone hole 201 is not limited to the illustrated example and may vary. In various embodiments, the electronic device 1 may include a plurality of microphones capable of detecting the direction of sound.

The input module may include, for example, key input devices 2021 and 2022. The key input devices 2021 and 2022 may be located, for example, in openings (not shown) provided on the first side surface 10C. In various embodiments, the electronic device 1 may not include some or all of the key input devices 2021 and 2022, and the non-included key input device may be implemented as a soft key using the flexible display 10 or the sub-display 210. In various embodiments, the input module may include at least one sensor module.

The sound output module may include, for example, a speaker located inside the electronic device 1, and a speaker hole 203 provided on the second side surface 10D to correspond to the speaker. The position or number of the sound output module including the speaker and the corresponding speaker hole 203 is not limited to the illustrated example and may vary. In various embodiments, the microphone hole 201 and the speaker hole 203 may be implemented as one hole. In various embodiments, a piezo speaker without the speaker hole 203 may be implemented. The sound output module may include, for example, a receiver for a call located inside the electronic device 1, and a receiver hole 204 provided on the front surface 10A to correspond to the receiver for a call.

The camera module may include, for example, a first camera module (or front camera module) 205 positioned to correspond to the front surface 10A, or a plurality of second camera modules (or rear camera modules) 206 positioned to correspond to the rear surface 10B. The first camera module 205 and/or the plurality of second camera modules 206 may include one or more lenses, an image sensor, and/or an image signal processor. The position(s) or number of the first camera module 205 or the plurality of second camera modules 206 is not limited to the illustrated example and may vary.

According to an embodiment, the flexible display 20 may have an opening aligned with the first camera module 205. External light may reach the first camera module 205 through the front cover 101 and the opening of the flexible display 20. In various embodiments, the opening of the flexible display 20 may be provided in the form of a notch depending on the position of the first camera module 205. In various embodiments, the first camera module 205 may be disposed on the rear surface of the flexible display 20 or below or beneath the flexible display 20 and may perform a related function (e.g., image capturing) even though the position of the first camera module 205 is not visually distinguished (or exposed). The first camera module 205 may include, for example, an under display camera (UDC). In various embodiments, the first camera module 205 may be positioned aligned with a recess provided on the rear surface of the flexible display 20. The first camera module 205 may be disposed to overlap with at least a portion of the screen, and may acquire an image of an external subject without being visually exposed to the outside. In this case, a portion of the flexible display 20 overlapped with the first camera module 205 at least in part may include a pixel structure and/or a wiring structure different from the other portion. For example, a portion of the flexible display 20 overlapped with the first camera module 205 at least in part may have a pixel density different the other portion. The pixel structure and/or the wiring structure provided in a portion of the flexible display 20 overlapped at least in part with the first camera module 205 may reduce light loss between the outside and the first camera module 205. In various embodiments, pixels may not be disposed in a portion of the flexible display 20 overlapped at least in part with the first camera module 205.

According to an embodiment, the plurality of second camera modules 206 may have different properties (e.g., angle of view) or functions and may include, for example, a dual camera or a triple camera. The plurality of second camera modules 206 may include a plurality of camera modules including lenses having different angles of view, and the electronic device 1 may control the angle of view of the camera module to be changed in response to a user's selection. The plurality of second camera modules 206 may include at least one of a wide-angle camera, a telephoto camera, a color camera, a monochrome camera, or an infrared (IR) camera (e.g., a time-of-flight (TOF) camera, a structured light camera). In various embodiments, the IR camera may be operated as at least part of a sensor module. In various embodiments, the number or positions of the second camera modules is not limited to the illustrated example and may vary. The electronic device 1 may include a flash 207 as a light source for the plurality of second camera modules 206. The flash 207 may include, for example, a light emitting diode or a xenon lamp.

The sensor module may generate an electrical signal or data value corresponding to an internal operating state of the electronic device 1 or an external environmental state. The sensor module may include, for example, at least one of a proximity sensor, a gesture sensor, a gyro sensor, a barometric pressure sensor, a magnetic sensor, an acceleration sensor, a grip sensor, a color sensor, an IR (infrared) sensor, a biometric sensor (e.g., a fingerprint sensor, an HRM sensor), a temperature sensor, a humidity sensor, or an illuminance sensor.

According to an embodiment, the sensor module may include an optical sensor 208 located inside the electronic device 1 to correspond to the front surface 10A. The optical sensor 208 may include, for example, a proximity sensor or an illuminance sensor. The optical sensor 208 may be aligned with an opening provided in the flexible display 20. External light may be introduced into the optical sensor 208 through the front cover 101 and the opening of the flexible display 20. In various embodiments, the optical sensor 208 may be located on the rear surface of the flexible display 20 or below or beneath the flexible display 20 and may perform a related function even though the position of the optical sensor 208 is not visually distinguished (or exposed). In various embodiments, the optical sensor 208 may be positioned aligned with a recess provided on the back surface of the flexible display 20. The optical sensor 208 may be disposed to overlap with at least a portion of the screen, and may perform a sensing function without being exposed to the outside. In this case, a portion of the flexible display 20 overlapped with the optical sensor 208 at least in part may include a pixel structure and/or a wiring structure different from the other portion. For example, a portion of the flexible display 20 overlapped with the optical sensor 208 at least in part may have a pixel density different the other portion. In various embodiments, the sensor module may include a fingerprint sensor (not shown) located below the flexible display 20. The fingerprint sensor may be implemented in a capacitive scheme, an optical scheme, or an ultrasonic scheme. A pixel structure and/or a wiring structure provided in a portion of the flexible display 20 overlapped at least in part with the sensor module may reduce the loss when various types of signals (e.g., light or ultrasound) related to the sensor module to pass between the outside and the sensor module. In various embodiments, a plurality of pixels may not be disposed in a portion of the flexible display 20 overlapped at least in part with the sensor module.

The connection terminal may include, for example, a connector (e.g., a USB connector) located inside the electronic device 1. The electronic device 1 may include a connector hole 209 provided on the second side surface 10D to correspond to the connector. The electronic device 1 may transmit/receive power and/or data to/from an external electronic device electrically connected to the connector through the connector hole 209. The positions or numbers of the connector and the corresponding connector hole 209 are not limited to the illustrated example and may vary.

The sub-display 210 may be located, for example, inside the first housing 110 adjacent to the first rear cover 111. A portion of the first rear cover 111 may overlap with the sub-display 210 and may be substantially transparent. In the folded state of FIG. 3, the electronic device 1 may output an image through the sub-display 210 instead of the flexible display 20.

Figure 4:
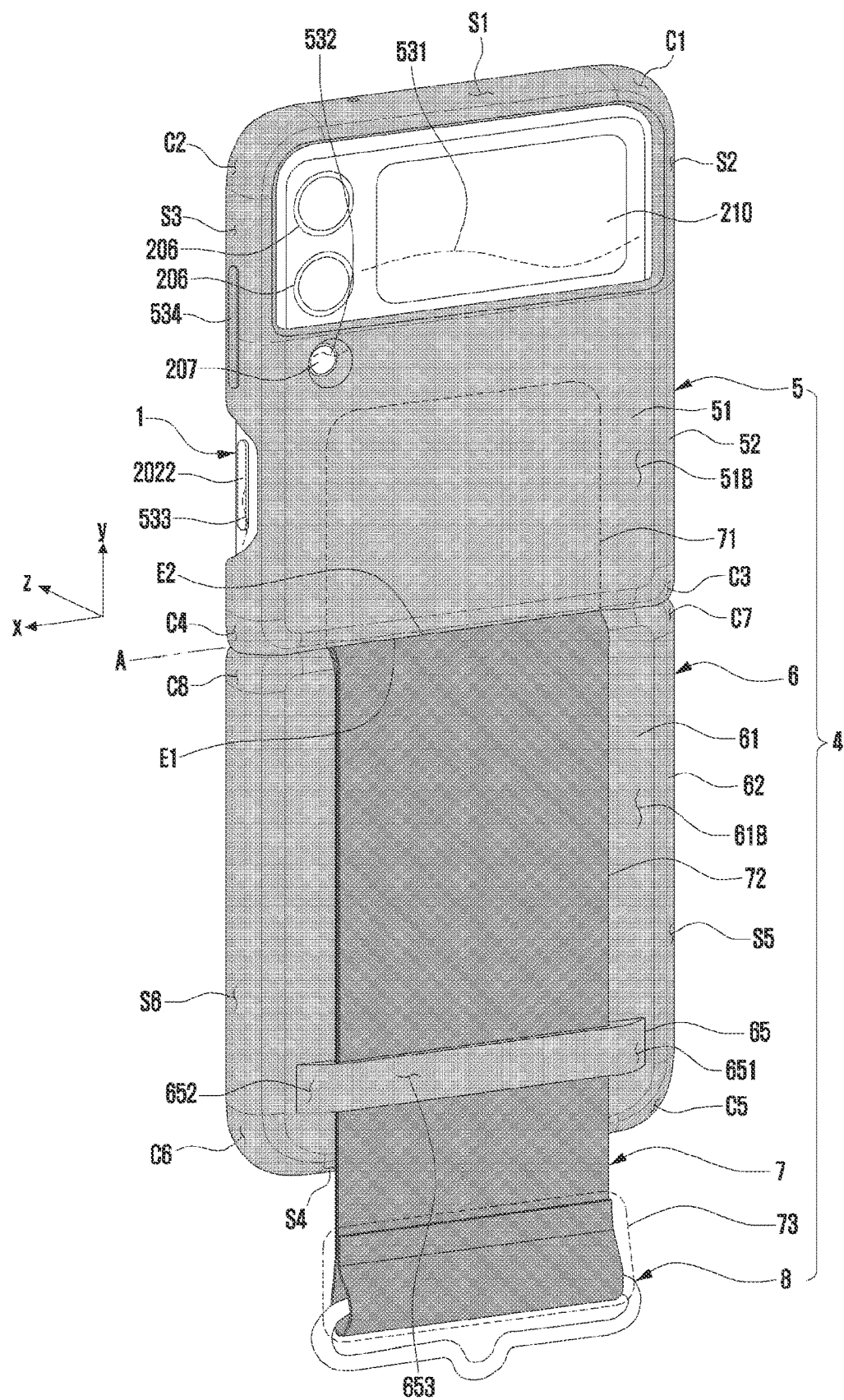
FIGS. 4 and 5 are perspective views of a foldable electronic device combined with a cover in an unfolded state according to various embodiments.
Figure 5:
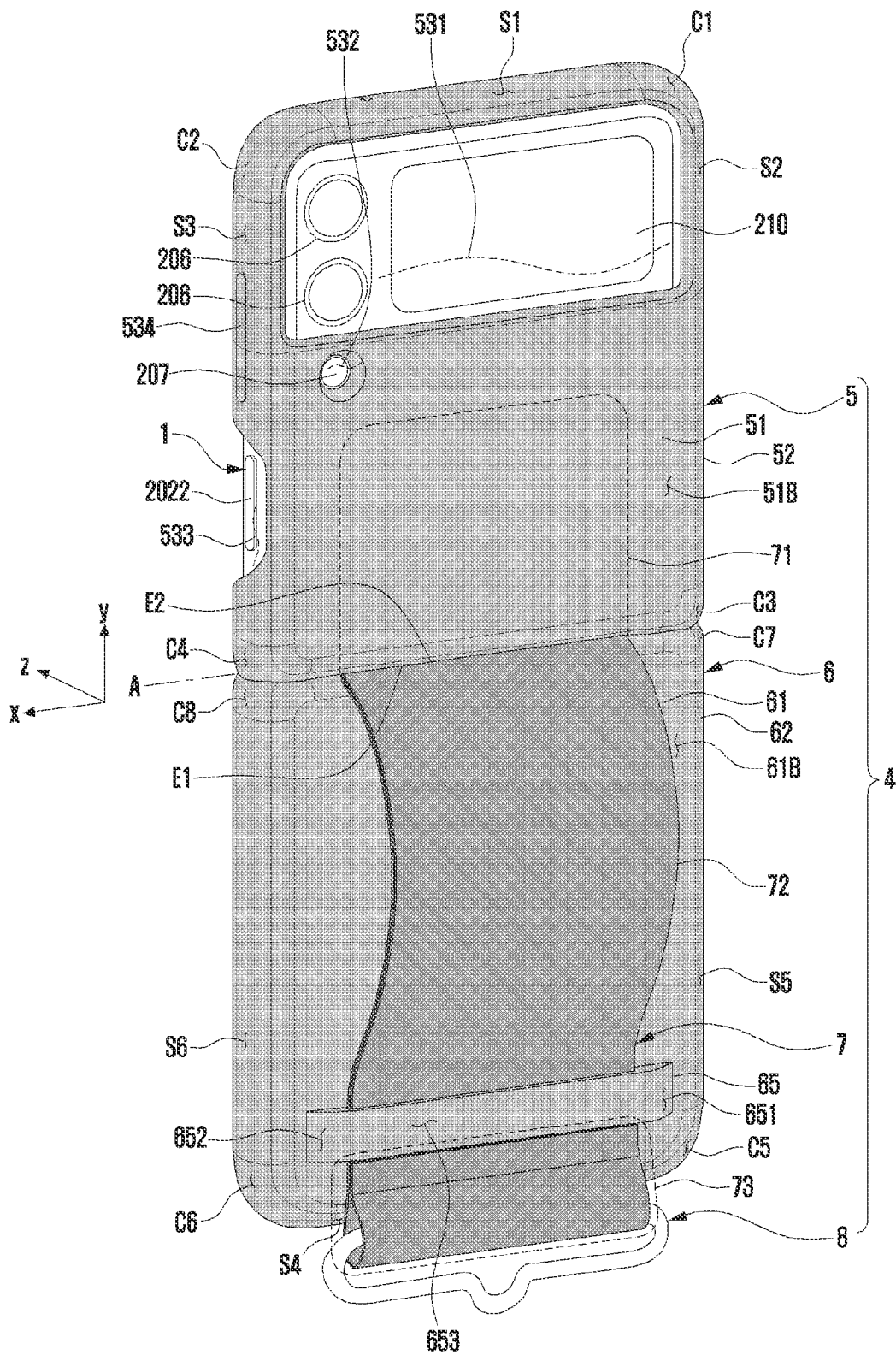
Figure 6:
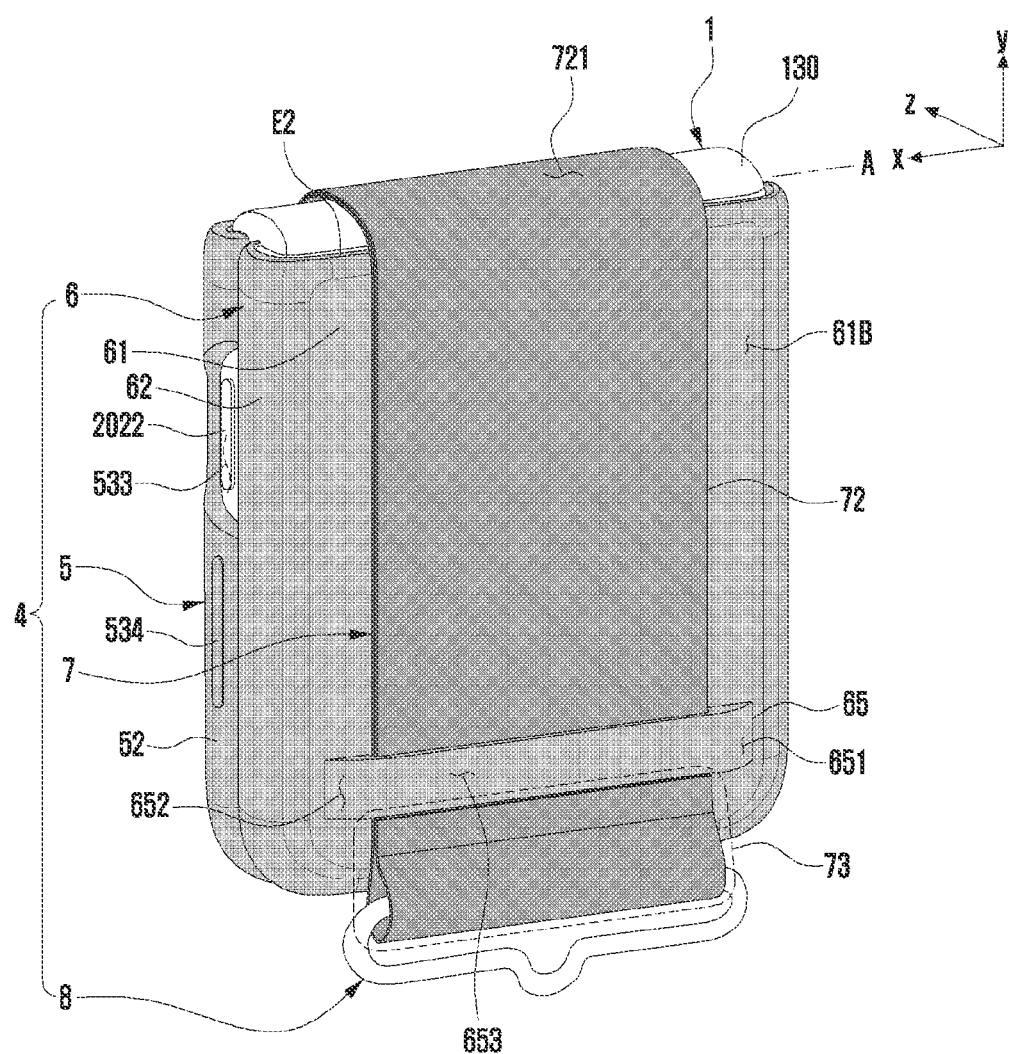
FIGS. 6 and 7 are perspective views of a foldable electronic device combined with a cover in a folded state according to various embodiments.
Figure 7:
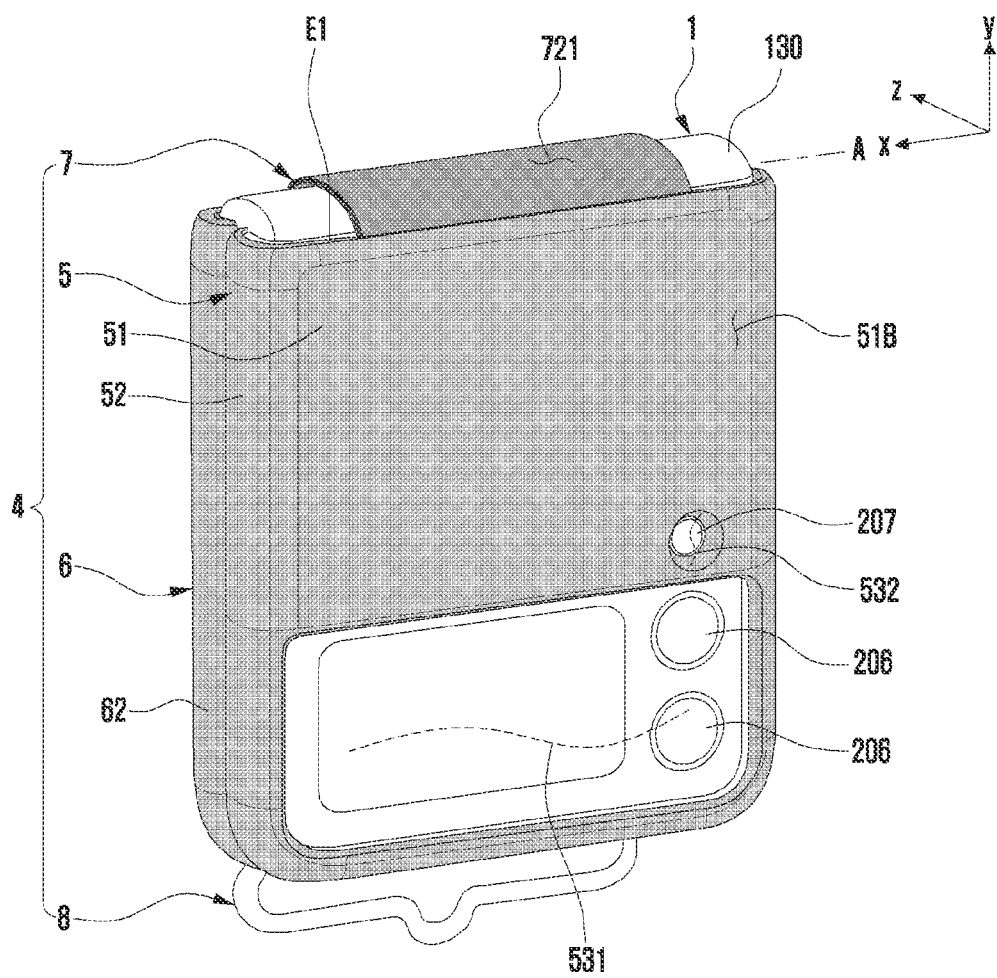
Figure 8:
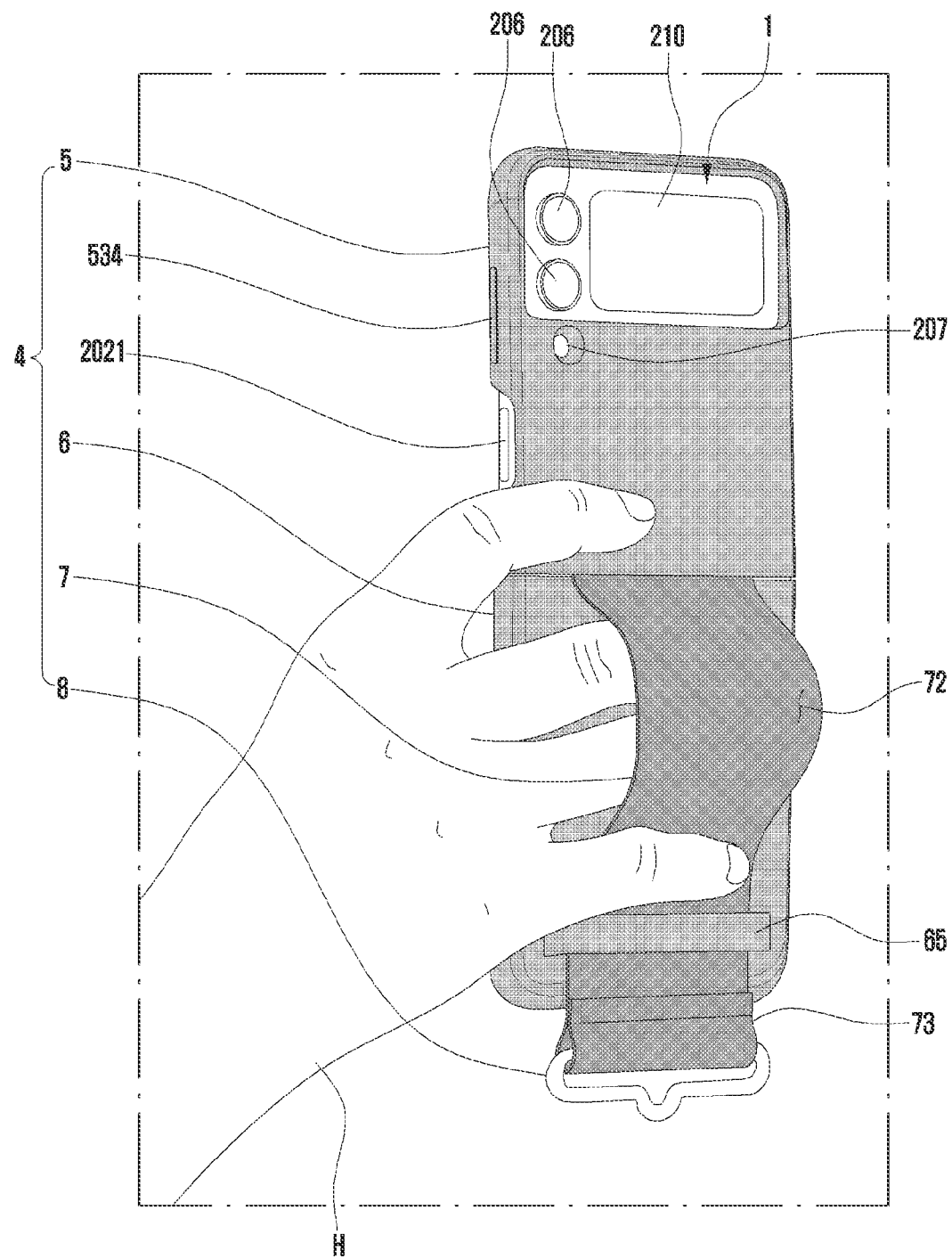
FIG. 8 is a perspective view of a foldable electronic device combined with a cover in a state of being carried by hand according to various embodiments.
Figure 9:
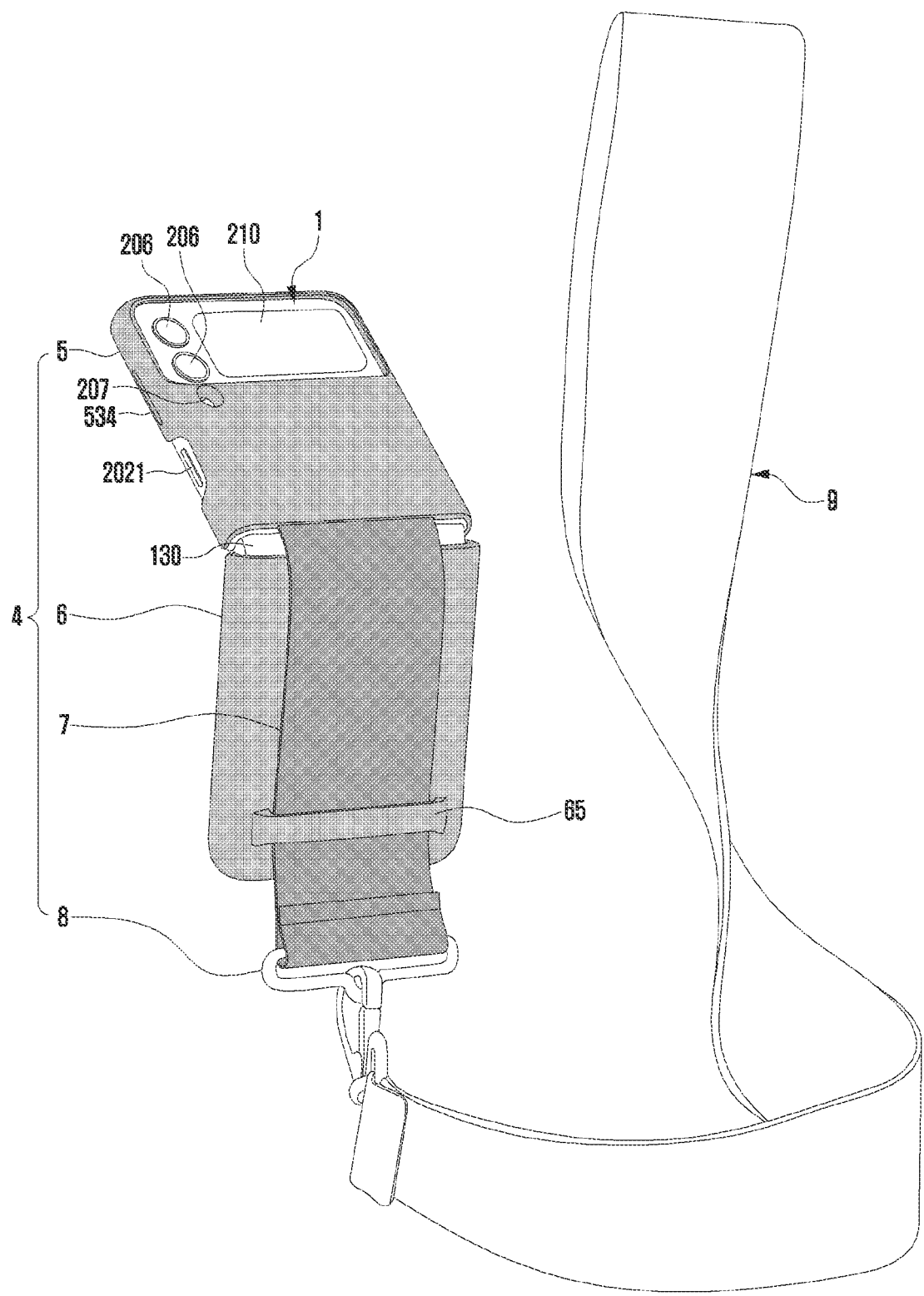
FIG. 9 is a perspective view of a foldable electronic device in a state in which a cover disposed on the electronic device is connected to another strap according to various embodiments.

FIGS. 4 and 5 are perspective views of a foldable electronic device 1 combined with a cover 4 in an unfolded state according to various embodiments. FIGS. 6 and 7 are perspective views of a foldable electronic device 1 combined with a cover 4 in a folded state according to various embodiments. FIG. 8 is a perspective view of a foldable electronic device 1 combined with a cover 4 is carried by hand H according to various embodiments. FIG. 9 is a perspective view of a cover 4 disposed on a foldable electronic device 1 connected to another strap 9 according to various embodiments.

With reference to FIGS. 4, 5, 6, and 7, the cover 4 may be attachable to and detachable from the electronic device 1. The cover 4 may be disposed on the foldable housing 10 (see FIG. 2) of the electronic device 1. The cover 4 may be disposed on the electronic device 1 and protect the electronic device 1 from external shocks or foreign substances. In an embodiment, the cover 4 may include a first cover 5, a second cover 6, a strap 7, and/or a connection member (or a connection part or connection support) 8. In various embodiments, the cover 4 may be defined as one of components of the electronic device 1.

According to an embodiment, the first cover 5 may be combined with the first housing 110 (see FIG. 1, 2, or 3) of the foldable housing 10. The first cover 5 may include, for example, a first bottom (or a first base portion or a first plate) 51 and a first side (or a first border, a first sidewall structure, a first sidewall portion, or a first sidewall) 52 extending from an edge of the first bottom 51. The first bottom 51 may cover at least a part of the third cover area ③ (see FIG. 2 or 3) provided by the first housing 110 (see FIG. 1, 2, or 3) of the electronic device 1. The first side 52 may cover at least a part of the first side surface 10C (see FIG. 1, 2, or 3) provided by the first housing 110 of the electronic device 1. In an embodiment (see FIGS. 4 and 5), the first side 52 may include a first sidewall S1, a second sidewall S2, a third sidewall S3, a first corner C1, a second corner C2, a third corner C3, and/or a fourth corner C4. When viewed from above the first bottom 51 (e.g., when viewed in the positive z-axis direction), the first sidewall S1 may cover at least a part of the first side surface 10C of the first housing 110 that is spaced apart from and extends in parallel with the folding axis A. When viewed from above the first bottom 51, the second sidewall S2 may cover at least a part of the first side surface 10C of the first housing 110 that extends perpendicular to the folding axis A, and may be perpendicular to the first sidewall S1. When viewed from above the first bottom 51, the third sidewall S3 may cover at least a part of the first side surface 10C of the first housing 110 that extends perpendicular to the folding axis A, may be perpendicular to the first sidewall S1, and may be spaced apart from and parallel to the second sidewall S2. The first corner C1 may connect seamlessly the first sidewall S1 and the second sidewall S2 and cover at least in part a first corner portion (not shown) of the first side surface 10C of the first housing 110. The second corner C2 may connect seamlessly the first sidewall S1 and the third sidewall S3 and cover at least in part a second corner portion (not shown) of the first side surface 10C of the first housing 110. The third corner C3 may extend seamlessly from the second sidewall S2 and cover at least in part a third corner portion (not shown) of the first side surface 10C of the first housing 110. The fourth corner C4 may extend seamlessly from the third sidewall S3 and cover at least in part a fourth corner portion (not shown) of the first side surface 10C of the first housing 110. The first cover 5 may have a first recess (not shown) for receiving and holding the first housing 110 of the electronic device 1, based on the first bottom 51 and the first side 52. The first side surface 10C of the first housing 110 may be provided as a laterally convex curved surface. The first side 52 of the first cover 5 may be provided in a laterally convex curved shape so as to cover the first side surface 10C of the first housing 110 with the first recess interposed therebetween. Due to the elasticity of the first cover 5, the first cover 5 may be detachably attached to the first housing 110. When the first housing 110 is disposed in the first recess of the first cover 5, the first side 52 supported by the first bottom 51 may elastically press the first housing 110, and the first housing 110 may be stably combined with the first cover 5 without shaking or loosening. The first side 52 of the first cover 5 may interfere with the first housing 110 so that the first housing 110 is not separated from the first cover 5. The first side 52 of the first cover 5 may act as a catching member such as a hook, and prevent or inhibit the first cover 5 from being separated from the first housing 110 against an external impact applied in a situation such as a fall of the electronic device 1.

According to an embodiment, the second cover 6 may be combined with the second housing 120 (see FIG. 1, 2, or 3) of the foldable housing 10. The first cover 5 and the second cover 6 may be separated from each other. The second cover 6 may include, for example, a second bottom (or a second base portion or a second plate) 61 and a second side (or a second border, a second sidewall structure, a second sidewall portion, or a second sidewall) 62 extending from an edge of the second bottom 61. The second bottom 61 may cover at least a part of the fourth cover area ④ (see FIG. 2) provided by the second housing 120 (see FIG. 1, 2, or 3) of the electronic device 1. The second side 62 may cover at least a part of the second side surface 10D (see FIG. 1, 2, or 3) provided by the second housing 120 of the electronic device 1. In an embodiment (see FIGS. 4 and 5), the second side 62 may include a fourth sidewall S4, a fifth sidewall S5, a sixth sidewall S6, a fifth corner C5, a sixth corner C6, a seventh corner C7, and/or an eighth corner C8. When viewed from above the second bottom 61 (e.g., when viewed in the positive z-axis direction), the fourth sidewall S4 may cover at least a part of the second side surface 10D of the second housing 120 that is spaced apart from and extends in parallel with the folding axis A. When viewed from above the second bottom 61, the fifth sidewall S5 may cover at least a part of the second side surface 10D of the second housing 120 that extends perpendicular to the folding axis A, and may be perpendicular to the fourth sidewall S4. When viewed from above the second bottom 61, the sixth sidewall S6 may cover at least a part of the second side surface 10D of the second housing 120 that extends perpendicular to the folding axis A, may be perpendicular to the fourth sidewall S4, and may be spaced apart from and parallel to the fifth sidewall S5. The fifth corner C5 may connect seamlessly the fourth sidewall S4 and the fifth sidewall S5 and cover at least in part a fifth corner portion (not shown) of the second side surface 10D of the second housing 120. The sixth corner C6 may connect seamlessly the fourth sidewall S4 and the sixth sidewall S6 and cover at least in part a sixth corner portion (not shown) of the second side surface 10D of the second housing 120. The seventh corner C7 may extend seamlessly from the fifth sidewall S5 and cover at least in part a seventh corner portion (not shown) of the second side surface 10D of the second housing 120. The eighth corner C8 may extend seamlessly from the sixth sidewall S6 and cover at least in part an eighth corner portion (not shown) of the second side surface 10D of the second housing 120. The second cover 6 may have a second recess (not shown) for receiving and holding the second housing 120 of the electronic device 1, based on the second bottom 61 and the second side 62. The second side surface 10D of the second housing 120 may be provided as a laterally convex curved surface. The second side 62 of the second cover 6 may be provided in a laterally convex curved shape so as to cover the second side surface 10D of the second housing 120 with the second recess interposed therebetween. Due to the elasticity of the second cover 6, the second cover 6 may be detachably attached to the second housing 120. When the second housing 120 is disposed in the second recess of the second cover 6, the second side 62 supported by the second bottom 61 may elastically press the second housing 120, and the second housing 110 may be stably combined with the second cover 6 without shaking or loosening. The second side 62 of the second cover 6 may interfere with the second housing 120 so that the second housing 120 is not separated from the second cover 6. The second side 62 of the second cover 6 may act as a catching member such as a hook, and prevent or inhibit the second cover 6 from being separated from the second housing 120 against an external impact applied in a situation such as a fall of the electronic device 1. In the folded state (see FIG. 6 or 7) of the electronic device 1 with which the cover 4 is combined, the first side 52 of the first cover 5 and the second side 62 of the second cover 6 may be aligned. For example, in the folded state of the electronic device 1 with which the cover 4 is combined, the first sidewall S1 and the fourth sidewall S4, the second sidewall S2 and the fifth sidewall S5, the third sidewall S3 and the sixth sidewall S6, the first corner C1 and the fifth corner C5, the second corner C2 and the sixth corner C6, the third corner C3 and the seventh corner C7, and the fourth corner C4 and the eighth corner C8 may be respectively aligned with each other.

According to an embodiment, the first cover 5 and the second cover 6 may be provided so as not to interfere with a change in the state of the electronic device 1 (e.g., transition between the unfolded state of FIGS. 1 and 2 and the folded state of FIG. 3). For example, it may be implemented so that friction (or contact) does not occur between the third corner C3 of the first cover 5 and the seventh corner C7 of the second cover 6 and between the fourth corner C4 of the first cover 5 and the eighth corner C8 of the second cover 6 in a state change of the electronic device 1. This can enable a smooth state change of the electronic device 1 and reduce the occurrence of noise caused by friction (e.g. friction joints).

According to an embodiment, the first cover 5 or the second cover 6 may have a plurality of openings positioned to correspond to components included in the electronic device 1. For example, the first bottom 51 of the first cover 5 may have a first opening 531, and the plurality of second camera modules 206 and the sub-display 210 may be exposed to the outside through the first opening 531. For example, the first bottom 51 of the first cover 5 may have the second opening 532, and the flash 207 may be exposed to the outside through the second opening 532. For example, the first side 52 of the first cover 5 may have a third opening 533, and the key input device 2022 may be exposed to the outside through the third opening 533. The third opening 533 may have a notch shape as shown, but it may be provided in the form of a through-hole in various embodiments. Although not shown, the second side 62 of the second cover 6 may have an opening positioned to correspond to the microphone hole 201, the speaker hole 203, or the connector hole 209 shown in FIG. 1, 2, or 3.

According to an embodiment, the first side 52 of the first cover 5 may include a portion (hereinafter, a key cover portion) 534 that corresponds to the key input device 2021 (see FIG. 1 or 3) and covers the key input device 2021. The key cover portion 534 may have, for example, a shape of protruding from the third sidewall S3 to cover the key input device 2021 protruding from the first side 10C (see FIG. 1 or 3) of the electronic device 1. The key cover portion 534 may have flexibility to enable the key input device 2021 to be pressed. In various embodiments, instead of the key cover portion 534, a fourth opening separate from the third opening 533 may be provided. In various embodiments, replacing the key cover portion 534, the third opening 533 may be expanded.

According to an embodiment, the first cover 5 or the second cover 6 may include various polymers such as engineering plastic (e.g., polycarbonate (PC) or polymethyl methacrylate (PMMA)). The first cover 5 or the second cover 6 may include a polymer resin such as, for example, polyether ether ketone, polyphenylene sulfide, polybutylene terephthalate, polyimide, or polycarbonate. In various embodiments, the first cover 5 or the second cover 6 may include a material (e.g., fiber reinforced plastic (FRP)) in which an engineering plastic is mixed with various reinforcing substrates such as glass fiber or carbon fiber.

According to an embodiment, the first cover 5 and the second cover 6 may include the same polymer. In various embodiments, the first cover 5 and the second cover 6 may include different polymers. In various embodiments, the first cover 5 or the second cover 6 may have various colors.

According to various embodiments, the first cover 5 or the second cover 6 may include a metallic material. Even if the first cover 5 may be formed of a metal material, it can be elastically combined with the first housing 110 (see FIG. 2) of the electronic device 1 because of the structure including the first bottom 51 and the first side 52. Similarly, even if the second cover 6 may be formed of a metal material, it can be elastically combined with the second housing 120 (see FIG. 2) of the electronic device 1 because of the structure including the second bottom 61 and the second side 62.

According to an embodiment, the first cover 5 may include a first edge (or first border) E1 positioned to correspond to the folding axis A of the electronic device 1. The second cover 6 may include a second edge (or second border) E2 positioned to correspond to the folding axis A of the electronic device 1. The first edge E1 and the second edge E2 may be provided so as not to interfere with the unfolded state of the electronic device 1. For example, the first edge E1 and the second edge E2 may at least partially contact each other in the unfolded state of the electronic device 1, but they may be provided so that there is substantially no effect of stress between the first cover 5 and the second cover 6. In an embodiment, when the electronic device 1 is switched from the folded state (see FIG. 6 or 7) to the unfolded state (see FIG. 4 or 5), the hinge cover 130 of the electronic device 1 may not be substantially exposed to the outside while a gap between the first edge E1 of the first cover 5 and the second edge E2 of the second cover 6 is reduced. When the electronic device 1 is switched from the unfolded state (see FIG. 4 or 5) to the folded state (see FIG. 6 or 7), the hinge cover 130 of the electronic device 1 may be exposed to the outside while the gap between the first edge E1 of the first cover 5 and the second edge E2 of the second cover 6 becomes open. Although not shown, when the electronic device 1 is in the intermediate state of the folded state, the hinge cover 130 may be exposed to the outside through the gap between the first edge E1 of the first cover 5 and the second edge E2 of the second cover 6. The hinge cover 130 may be exposed to the outside much more in the fully folded state of the folded state than the intermediate state of the folded state.

According to various embodiments, the first edge E1 of the first cover 5 or the second edge E2 of the second cover 6 may be formed of a flexible material or a cushioning material so as to mitigate the impact between the first and second covers 5 and 6 when the electronic device 1 is switched from the folded state (see FIG. 6 or 7) to the unfolded state (see FIG. 4 or 5). For example, the cover 4 may further include a flexible member (or flexible material) or a cushioning member (or cushioning material) combined with the first cover 5 to provide a flexible first edge E1. For example, the cover 4 may further include a flexible member (or flexible material) or a cushioning member (or cushioning material) combined with the second cover 6 to provide a flexible second edge E2.

According to an embodiment, the strap 7 may connect the first cover 5 and the second cover 6. The strap 7 may include a first portion 71 connected to the first bottom 51 of the first cover 5, and a second portion 72 extending from the first portion 71 and connected to the second bottom 61 of the second cover 6. The strap 7 may include a sheet or plate formed of a material such as, for example, fabric, polymer, or leather, and may have bending properties (e.g., flexibility).

According to an embodiment, when the first cover 5 is disposed on the first housing 110 of the electronic device 1, the first portion 71 of the strap 7 may be positioned between the first housing 110 and the first cover 5. The first cover 5 may be obscure, so when the first cover 5 is disposed on the first housing 110 of the electronic device 1, the first portion 71 of the strap 7 may not be exposed to the outside. For example, the first portion 71 of the strap 7 may be disposed on or attached to a first surface (not shown) of the first bottom 51 of the first cover 5 facing the third cover area ③ (see FIG. 2 or 3) of the electronic device 1. In an embodiment, the first surface of the first bottom 51 may have a recess in which the first portion 71 of the strap 7 is located. In various embodiments, the first portion 71 of the strap 7 may be positioned inside the first bottom 51.

According to various embodiments, the first portion 71 of the strap 7 may be disposed on or attached to a second surface 51B of the first bottom 51 opposite to the first surface. In various embodiments, the second surface 51B of the first bottom 51 may have a recess in which the first portion 71 of the strap 7 is located.

According to an embodiment, the second cover 6 may include an opening structure (or a hole structure, an opening part, an opening providing part, or an opening portion) 65 provided on the second bottom 61. The opening structure 65 may be provided on a fourth surface 61B of the second bottom 61. The fourth surface 61B may be located opposite to a third surface (not shown) of the second bottom 61 facing the fourth cover area ④ (see FIG. 2) of the electronic device 1. The opening structure 65 may include, for example, a first structure part (or third portion) 651 connected to a first area (not shown) of the fourth surface 61B, a second structure part (or fourth portion) 652 connected to a second area (not shown) of the fourth surface 61B, and a third structure part (or fifth portion) 653 connecting the first structure part 651 and the second structure 652 part. The third structure part 653 may be positioned to be spaced apart from a third area (not shown) between the first and second areas of the fourth surface 61B. Based on the opening structure 65, the second cover 6 may have an opening formed by the first structure part 651, the second structure part 652, the third structure part 653, and the third area. In an embodiment, the second portion 72 of the strap 7 may extend from the first portion 71 through between the first edge E1 of the first cover 5 and the second edge E2 of the second cover 6 and then pass through the opening of the opening structure 65. The second portion 72 of the strap 7 can be moved through the opening structure 65 of the second cover 6. The opening structure 65 may be located closer to the fourth sidewall S4 than to the second edge E2. In various embodiments, the opening structure is not limited to the illustrated example and may be provided in various other forms. In another example, the opening structure may be provided in the second bottom 61 so as not to protrude from the fourth surface 61B.

According to an embodiment, a part 721 of the second portion 72 included in the strap 7 may cover and protect at least a part of the hinge cover 130 exposed to the outside in the folded state (see FIG. 6 or 7) of the electronic device 1. Hereinafter, the part 721 of the second portion 72 facing the hinge cover 130 in the folded state of the electronic device 1 will be referred to as a 'hinge housing cover region'. In various embodiments, a flexible material may be disposed on a rear surface of the hinge housing cover region 721 that may face the hinge cover 130. In various embodiments, a lubricating material may be adhered to or coated on the rear surface of the hinge housing cover region 721 so as to reduce friction with the hinge cover 130.

According to an embodiment, the strap 7 may include a third portion 73 extending from the second portion 72. The third portion 73 may be provided so as not to pass through the opening of the opening structure 65 included in the second cover 6. In order not to pass through the opening structure 65, the third portion 73 may have a shape causing interference with an area (e.g., the first structure part 651, the second structure part 652, or the third structure part 653) surrounding the opening of the opening structure 65. The third portion 73 may make it difficult for the second cover 6 to disengage from the second portion 72 of the strap 7.

According to an embodiment, in the fully folded state (see FIG. 6 or 7) of the electronic device 1, the third portion 73 may come in contact with the opening structure 65, and a tension may be applied to the second portion 72 so that the second portion 72 does not lift from the fourth surface 61B of the second cover 6. For example, in the fully folded state of the electronic device 1, the second portion 72 of the strap 7 may be in contact with the hinge cover 130 and the fourth surface 61B of the second cover 6. In various embodiments, the fourth side 61B of the second cover 6 may have a recess in which the second portion 72 of the strap 7 can be located in the folded state of the electronic device 1.

According to an embodiment, the second portion 72 of the strap 7 may be in a movable state relative to the opening structure 65 of the second cover 6 in the unfolded state of the electronic device 1 shown in FIGS. 4 and 5. In another example, the second portion 72 of the strap 7 may be in a movable state relative to the opening structure 65 of the second cover 6 when the electronic device 1 is in the intermediate state (see FIG. 9). With reference to FIGS. 7 and 8, of the second portion 72 of the strap 7, a part located between the first portion 71 and the opening structure 65 may be adjusted in length to be used for stably carrying the electronic device 1 combined with the cover 4 with the hand H. In an embodiment, the second portion 72 of the strap 7 may be in a state where it is difficult to move relative to the opening structure 65 of the second cover 6 in the fully folded state of the electronic device 1 shown in FIGS. 6 and 7. For example, in the fully folded state of the electronic device 1, the second portion 72 of the strap 7 may be in contact with the hinge cover 130 and the fourth surface 61B of the second cover 6. In various embodiments, the second portion 72 of the strap 7 may have a movable length even in the fully folded state of the electronic device 1.

According to an embodiment, a connecting member (or connecting portion or connecting support) 8 may be connected to the third portion 73 of the strap 7. The connecting member 8 may be in the form of a ring made of a metallic material or a non-metallic material. The third portion 73 of the strap 7 may have a loop shape passing through the connecting member 8 and being bent. The third portion 73 may have a loop shape, for example, by being provided in a manner of attaching one end of the strap 7 to certain other point of the strap. Such a structure of the third portion 73 in which one end of the strap 7 overlaps with and is attached to other point of the strap may make it difficult for the third portion 73 to pass through the opening structure 65. The connecting member 8 may be used to connect an external member (or an external device or an external body) such as an accessory. For example, as shown in FIG. 9, another strap 9 for placement on a user's body, such as a hand strap (e.g., an accessory for mounting on a user's hand) or a neck strap (e.g., an accessory for mounting on a user's neck), may be connected to the connecting member 8 of the cover 4. Various other accessories may be connected to the connecting member 8 of the cover 4.

According to various embodiments, the third portion 73 that is difficult to pass through the opening structure 65 is not limited to the illustrated example, and it may be provided in various other shapes that may cause interference with the opening structure 65. For example, the third portion 73 may be implemented as a separate member disposed on or combined with the second portion 72 and connectable to the connecting member 8.

According to various embodiments, the third portion 73 may be implemented to be insertable at least partially into the opening structure 65 when the second portion 72 of the strap 7 is positioned so as not to lift from the fourth surface 61B of the second cover 6 in the fully folded state (see FIG. 6 or 7) of the electronic device 1, or when it is difficult for the user to lift any more a part of the second portion 72 of the strap 7 located between the first portion 71 and the opening structure 65.

According to various embodiments, various visual images such as letters or pictures may be implemented on the second portion 72 of the strap 7.

Figure 10:
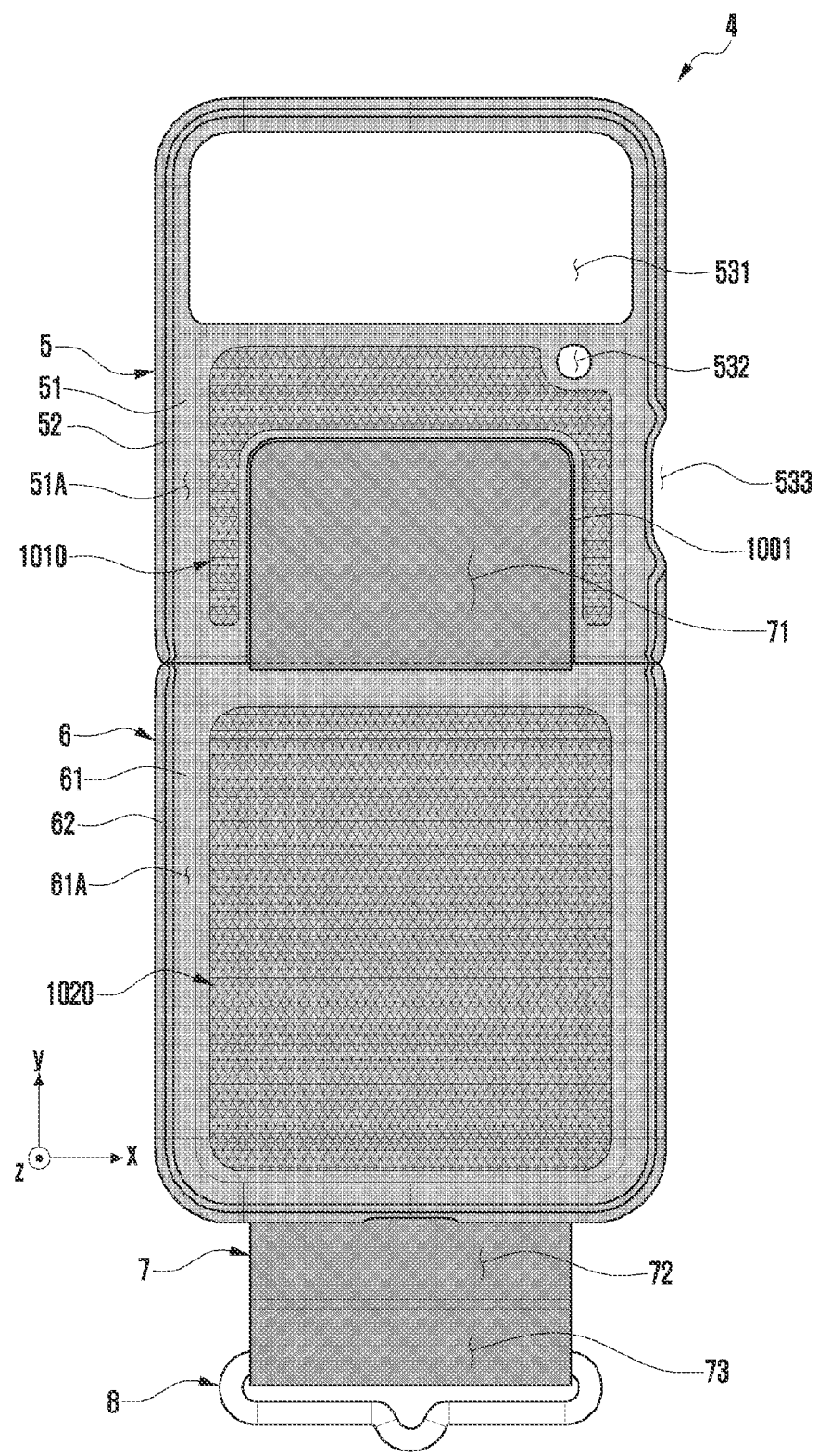
FIG. 10 is a diagram illustrating a foldable electronic device with a cover in an unfolded state according to various embodiments.

FIG. 10 is a diagram illustrating a cover 4 of a foldable electronic device 1 in an unfolded state (see FIG. 4 or 5) according to various embodiments.

With reference to FIG. 10, the cover 4 may include the first cover 5, the second cover 6, the strap 7, the connecting member 8, a first sheet 1010, and/or a second sheet 1020. A redundant description of components described with reference to FIG. 4, 5, 6, or 7 and indicated by the same reference numerals may not be repeated here.

According to an embodiment, the first bottom 51 of the first cover 5 may have a first surface 51A facing the third cover area ③(see FIG. 2 or 3) of the electronic device 1. The first portion 71 of the strap 7 may be disposed on or combined with the first face 51A. In an embodiment, an adhesive material (not shown) may be interposed between the first portion 71 and the first surface 51A. The adhesive material may include, for example, a heat-reactive adhesive material, a photo-reactive adhesive material, a general adhesive, and/or a double-sided tape. In various embodiments, the adhesive material between the first portion 71 and the first surface 51A may be an adhesive capable of adhering the first portion 71 to the first surface 51A only by applying a small amount of pressure at room temperature for a short time without using curing conditions such as water, solvent (e.g., curing agent), heat, or light. The adhesive material may give temporary adhesion capable of detaching and attaching the first portion 71 from and to the first surface 51A and have a non-curing feature. In case of the example in which the adhesive material is interposed between the first portion 71 and the first surface 51A, the first portion 71 of the strap 7 may be detachable from the first bottom 51.

According to an embodiment, the first surface 51A of the first cover 5 may have a recess 1001 in which the first portion 71 of the strap 7 is located. The recess 1001 may contribute to reducing the thickness of a structure in which the first portion 71 of the strap 7 and the first bottom 51 of the first cover 5 are stacked. The structure in which the first portion 71 of the strap 7 is located in the recess 1001 of the first cover 5 may contribute to reducing a gap between the third cover area ③(see FIG. 2) of the first housing 110 and the first surface 51A when the first cover 5 is combined with the first housing 110 (see FIG. 2) of the electronic device 1.

According to an embodiment, the first sheet 1010 may be disposed on the first surface 51A of the first bottom 51 included in the first cover 5. The first sheet 1010 may include, for example, a flexible material such as rubber. When viewed from above the first surface 51A (e.g., in the negative z-axis direction), the first sheet 1010 may be disposed so as not to overlap with the first portion 71 of the strap 7. The first sheet 1010 may increase a contact or friction force with the first housing 110 (see FIG. 1 or 2) of the electronic device 1, thereby contributing to stably positioning the first housing 110 on the first cover 5. In various embodiments, the first sheet 1010 may be modified to be disposed on the first portion 71 of the strap 7 or to be expanded to the first portion 71 of the strap 7. In various embodiments, the first sheet 1010 may be modified to be disposed on the first side 52 of the first cover 5 or to be expanded to the first side 52.

According to an embodiment, the second sheet 1020 may be disposed on the third surface 61A of the second bottom 61 included in the second cover 6. The third surface 61A may face the fourth cover area ④ (see FIG. 2) of the electronic device 1. The second sheet 1020 may include, for example, a flexible material such as rubber. The second sheet 1020 may increase a contact or friction force with the second housing 120 (see FIG. 1 or 2) of the electronic device 1, thereby contributing to stably positioning the second housing 120 on the second cover 6. In various embodiments, the second sheet 1020 may be modified to be disposed on, or expanded to, the second side 62 of the second cover 6.

According to various embodiments, the first sheet 1010 or the second sheet 1020, as an adhesive sheet, may be an adhesive capable of being adhered to the cover 4 only by applying a small amount of pressure at room temperature for a short time without using curing conditions such as water, solvent (e.g., curing agent), heat, or light. The adhesive sheet may give temporary adhesion capable of being detached from and attached to the cover 4 and have a non-curing feature.

Figure 11:
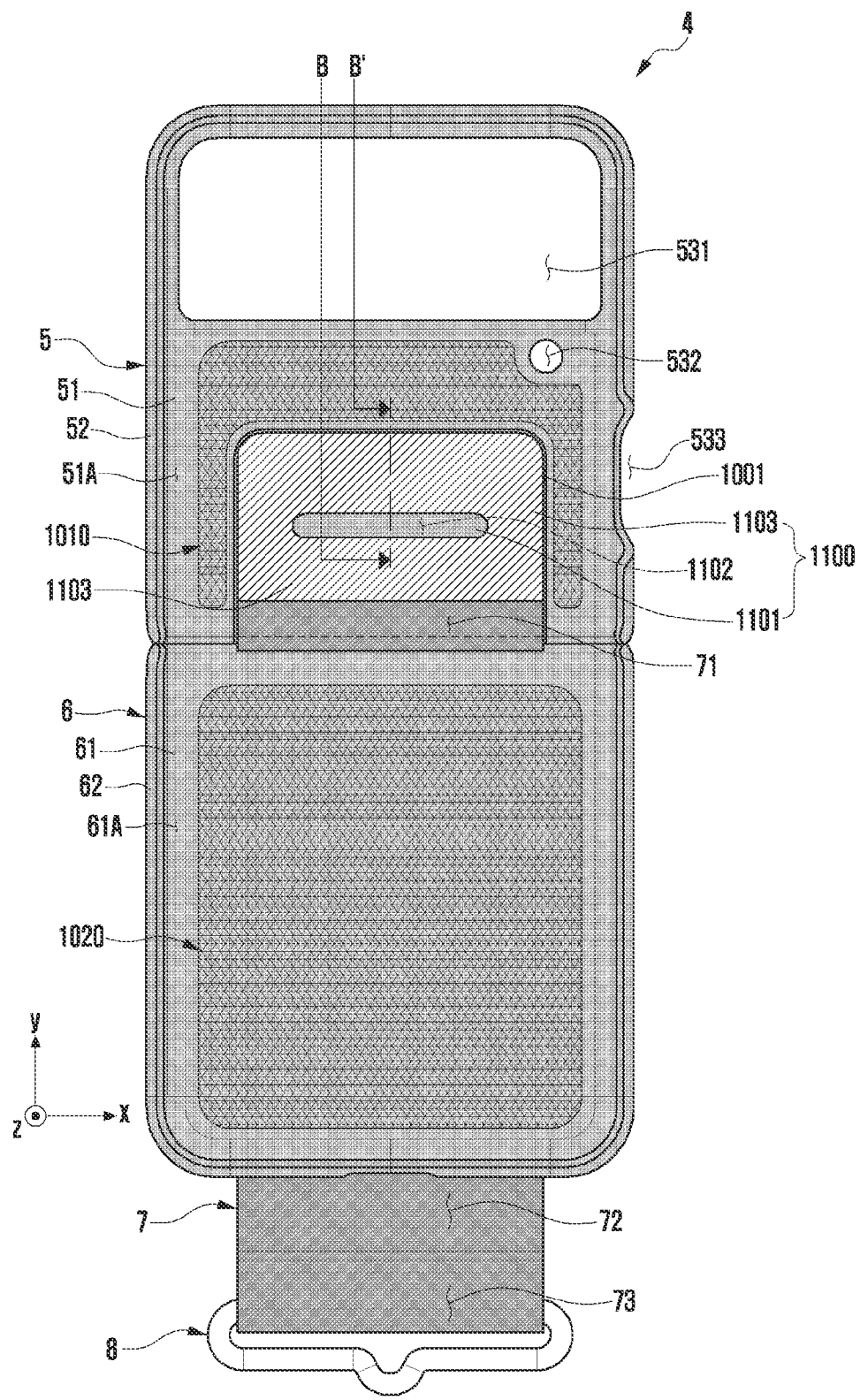
FIG. 11 is a diagram illustrating a foldable electronic device with a cover in an unfolded state according to various embodiments.

FIG. 11 is a diagram illustrating a cover 4 of a foldable electronic device 1 in an unfolded state according to various embodiments.

With reference to FIG. 11, the cover 4 may include the first cover 5, the second cover 6, the strap 7, the connecting member 8, the first sheet 1010, the second sheet 1020, and/or a hook fastening structure 1100. A redundant description of components described with reference to FIG. 4, 5, 6, 7, or 10 and indicated by the same reference numerals may not be repeated here.

According to an embodiment, the hook fastening structure 1100 may attach and detach the first portion 71 of the strap 7 to and from the first bottom 51. The hook fastening structure 1100 may include a hook structure (or a hook part or a hook) 1101 extending from the first bottom 51 of the first cover 5. The hook fastening structure 1100 may include a region 1103 of the first portion 71 of the strap 7 that has an opening 1102 corresponding to the hook structure 1101. The hook structure 1101 may be located in the recess 1001 provided in the first bottom 51. When the first portion 71 of the strap 7 is positioned in the recess 1001 provided in the first surface 51A of the first bottom 51, the hook structure 1101 may pass through the opening 1102. The hook structure 1101 may interfere with an area surrounding the opening 1102 of the first portion 71 to make it difficult for the first portion 71 of the strap 7 to be separated from the hook structure 1101.

According to an embodiment, the region 1103 having the opening 1102 of the first portion 71 of the strap 7 may be implemented substantially rigidly in order to increase a fastening force with the hook structure 1101. The substantially rigid region 1103 (hereinafter, a reinforced region) of the first portion 71 of the strap 7 may include, for example, a reinforcing member (or a reinforcing body or reinforcing portion) (e.g., a stiffener such as a reinforcing sheet or a reinforcing plate) of a non-metallic material (e.g., polymer) or a metallic material.

According to various embodiments, in the embodiment of FIG. 10, at least a part of the first portion 71 attached to the first cover 5 using an adhesive material may be implemented substantially rigidly by including a reinforcing member (or a reinforcing body or reinforcing portion).

Figure 12:
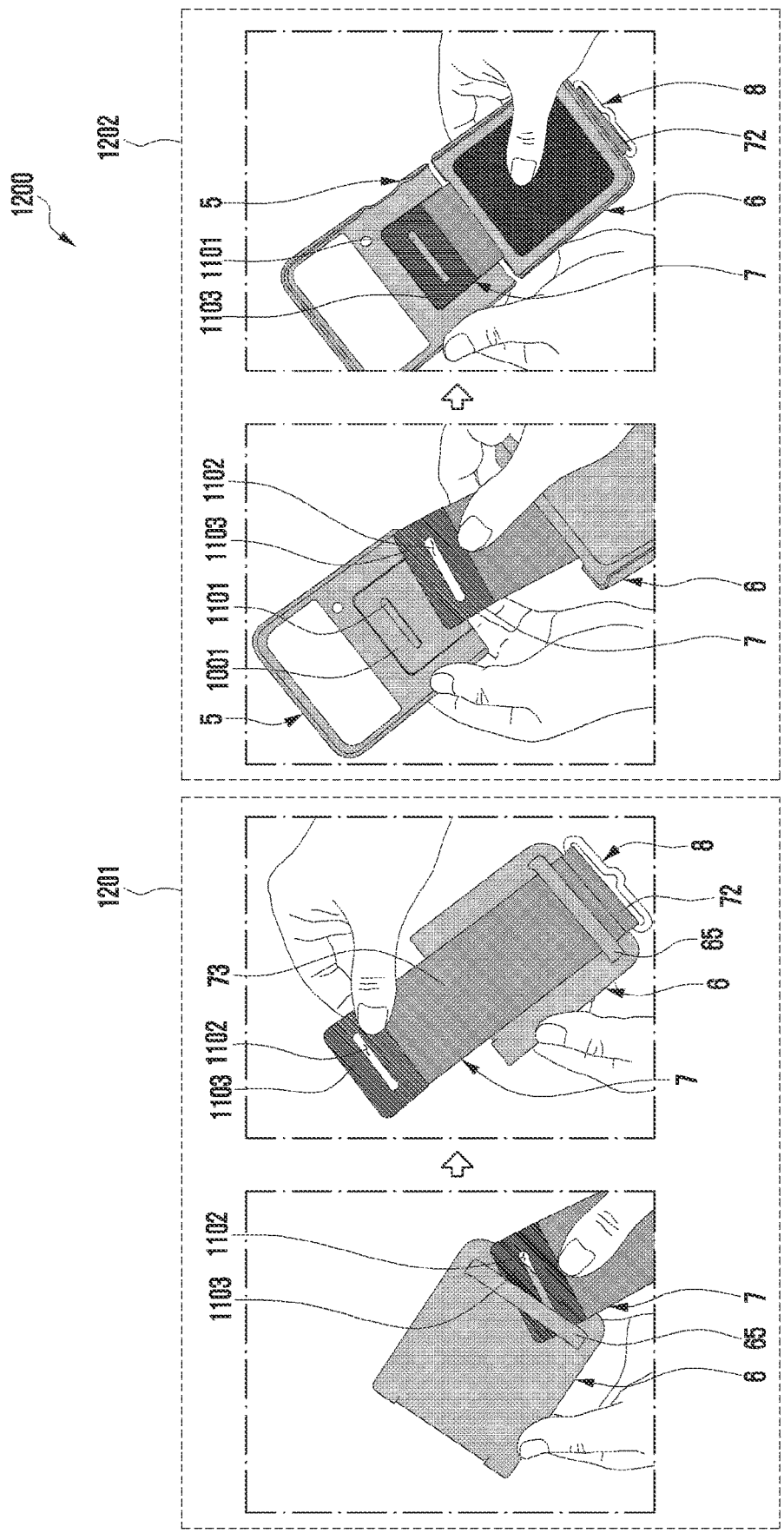
FIG. 12 is a diagram illustrating an example operation of connecting a strap with a first cover and a second cover in relation to the embodiment of FIG. 11 according to various embodiments.

FIG. 12 is a diagram illustrating an example operation 1200 for connecting a strap 7 with a first cover 5 and a second cover 6 in relation to the embodiment of FIG. 11 according to various embodiments.

With reference to FIG. 12, in an embodiment, at the first operation indicated by reference numeral '1201', the strap 7 in which the connecting member 8 is connected to the second portion 72 may be located by passing through the opening structure 65 of the second cover 6. At the second operation indicated by reference numeral '1202', the reinforced region 1103 having the opening 1102 of the strap 7 may be located in the recess 1001 of the first cover 5. The reinforced region 1103 may be hooked with the hook structure 1101 located in the recess 1001 of the first cover 5. The second portion 72 of the strap 7 may have a shape that interferes with the area surrounding the opening of the opening structure 65 so as not to pass through the opening structure 65 included in the second cover 6, so that the second cover 6 may be difficult to separate from the third portion 73 of the strap 7.

Figure 13:
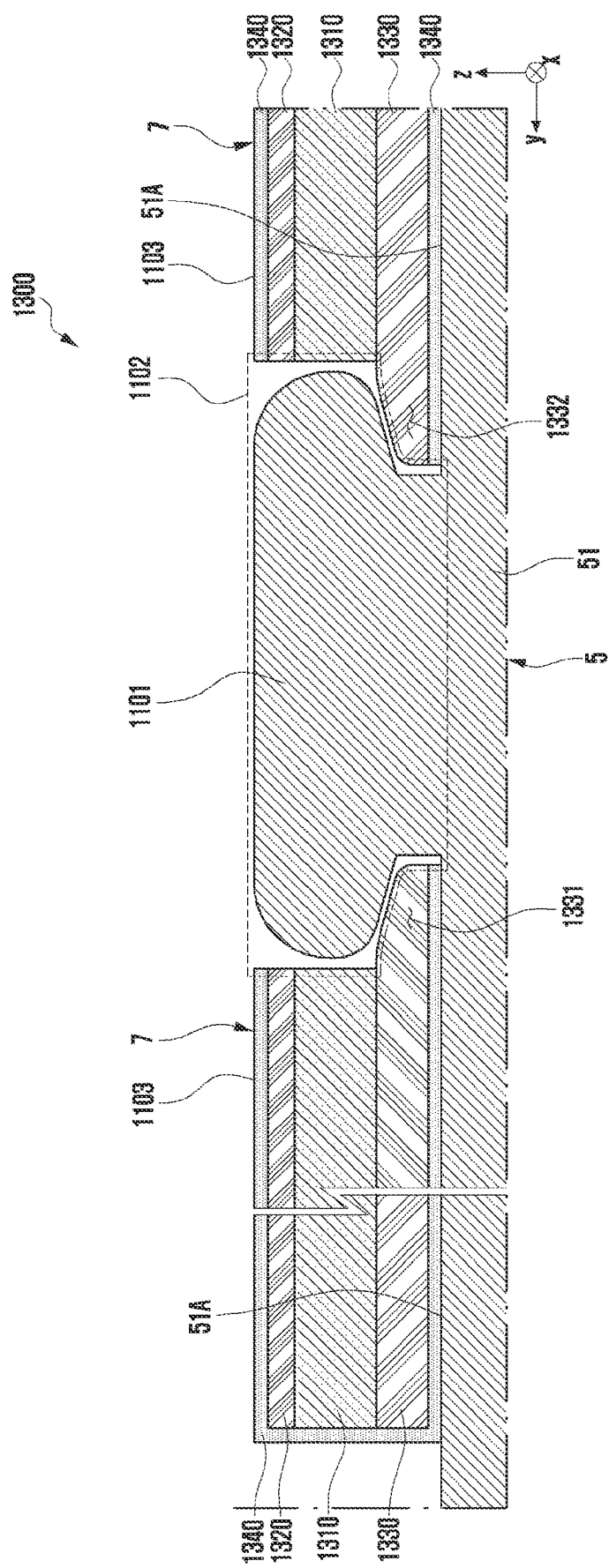
FIG. 13 is a cross-sectional view taken along line a B-B' in FIG. 11 according to various embodiments.

FIG. 13 is a cross-sectional view 1300 taken along line a B-B' in FIG. 11 according to various embodiments.

With reference to FIG. 13, in an embodiment, the cross-sectional view 1300 may include the hook structure 1101 extending from the first bottom 51 of the first cover 5, and the reinforced region 1103 of the strap 7. The reinforced region 1103 may have the opening 1102 in which the hook structure 1101 is inserted and positioned. When the reinforced region 1103 of the strap 7 is positioned on the first surface 51A of the first bottom 51, the hook structure 1101 may be inserted and positioned in the opening 1102. The hook structure 1101 may interfere with the area surrounding the opening 1102 of the reinforced region 1103 to make it difficult for the reinforced region 1103 of the strap 7 to disengage from the hook structure 1101.

According to an embodiment, the strap 7 may include a flexible sheet 1310, a first reinforcing plate (or a first stiffener) 1320, a second reinforcing plate (or a second stiffener) 1330, and/or a coating layer 1340. The flexible sheet 1310 may extend to, for example, the first portion 71 (see FIG. 4), the second portion 72 (see FIG. 4), and the third portion 73 (see FIG. 4) of the strap 7, and thus become a basis for contributing to the bending properties (e.g. flexibility) of the strap 7. The flexible sheet 1310 may be formed of, for example, a material such as fabric, polymer, or leather. The first reinforcing plate 1320, the second reinforcing plate 1330, and the coating layer 1340 may be located in the reinforced region 1103. A part of the flexible sheet 1310 included in the reinforced region 1103 may be positioned between the first reinforcing plate 1320 and the second reinforcing plate 1330. An adhesive material (not shown) may be positioned between the flexible sheet 1310 and the first reinforcing plate 1320 and/or between the flexible sheet 1310 and the second reinforcing plate 1330. The second reinforcing plate 1330 may be located closer to the first surface 51A of the first cover 5 than the first reinforcing plate 1320. The second reinforcing plate 1330 may include one or more portions 1331 and 1332 that interfere with the hook structure 1101. The first reinforcing plate 1320 and/or the second reinforcing plate 1330 may be more difficult to bend than the flexible sheet 1310 or may be substantially rigid. The reinforced region 1103 may have rigidity because of the first reinforcing plate 1302 and the second reinforcing plate 1303. The first reinforcing plate 1320 and/or the second reinforcing plate 1330 may include, for example, a non-metallic material (e.g., a polymer) or a metallic material. The coating layer 1340 may be a final layer for protecting the reinforced region 1103 from the outside. In various embodiments, the first reinforcing plate 1320 may be positioned within the flexible sheet 1310. For example, the flexible sheet 1310 may include a plurality of stacked layers, and the first reinforcing plate 1320 may be interposed between two adjacent layers among the plurality of stacked layers. In various embodiments, the first reinforcing plate 1320 may be omitted. In various embodiments, the coating layer 1340 may be omitted. The reinforced region 1103 may be provided in various other stack structures, thereby contributing to ensuring a fastening force with the hook structure 1101.

According to an embodiment, the thickness (e.g., the thickness in the z-axis direction) of the reinforced region 1103 may be provided so as not to be greater than the depth of the recess 1001 (see FIG. 11) provided in the first surface 51A of the first cover 5.

According to various embodiments, the first portion 71 of the strap 7 may be combined with the first cover 5 using a screw (or bolt), not limited to the embodiment of FIG. 10 or 11. According to various embodiments, the first portion 71 of the strap 7 may be combined with the first cover 5 using a connection structure (or attachment structure) such as Velcro.

Figure 14:
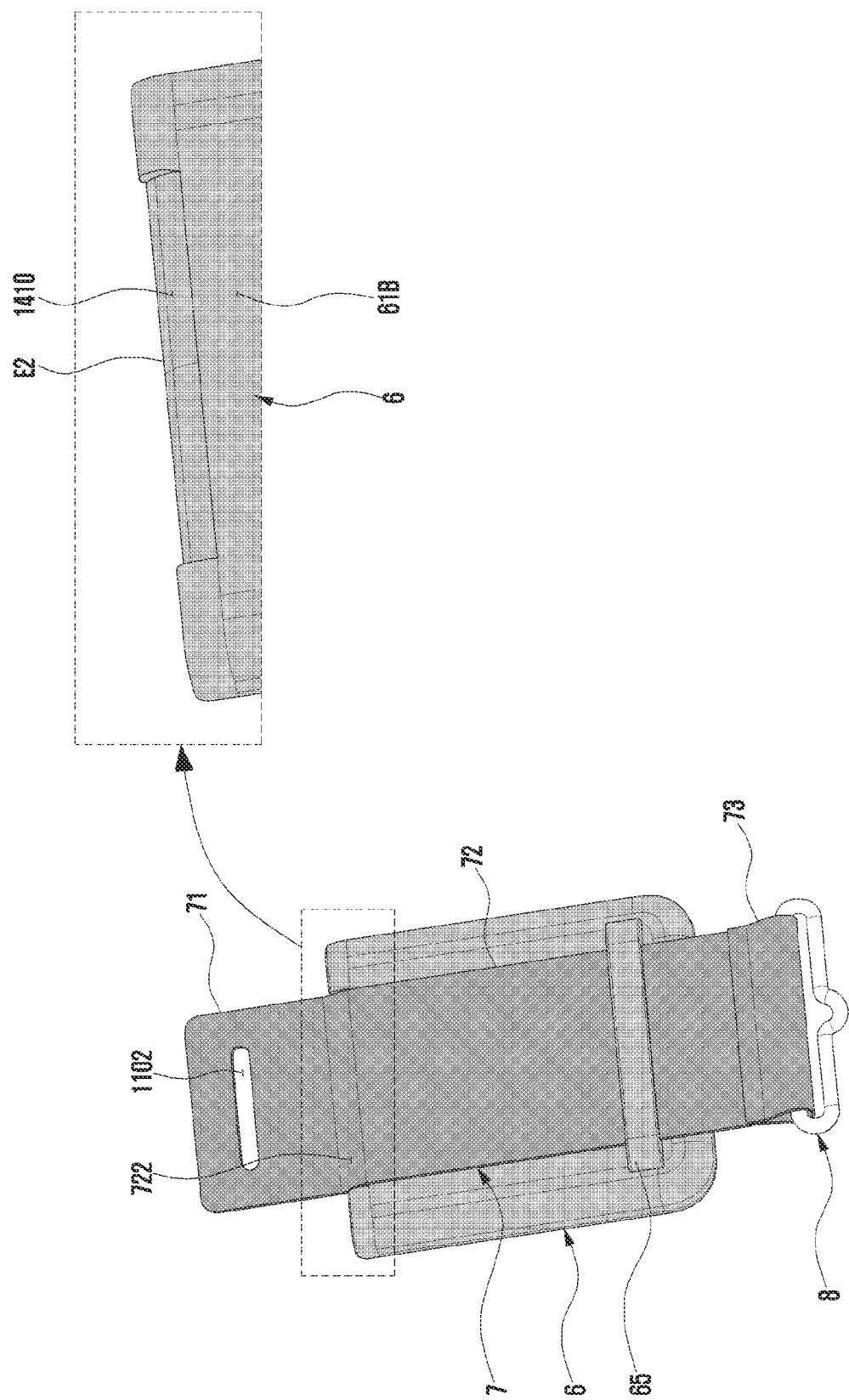
FIG. 14 is a diagram illustrating a second cover, a strap, and a connecting member according to various embodiments.

FIG. 14 is a diagram illustrating a second cover 6, a strap 7, and a connecting member 8 according to various embodiments.

With reference to FIG. 14, the second cover 6 may have a recess 1410 provided adjacent to the second edge E2. The recess 1410 may be provided, for example, on the fourth surface 61B (see FIG. 4 or 5) of the second cover 6 adjacent to the second edge E2. A part 722 of the second portion 72 included in the strap 7 may be located in the recess 1410. The recess 1410 may have, for example, an inclined surface or curved surface that guides the part 722 of strap 7 into a bent position. The inclined surface or curved surface of the recess 1410 may be inclined downward toward the second edge E2. The recess 1410 may reduce the effect of stress between the first cover 5 (see FIG. 4 or 5) and the strap 7. In various embodiments, the second cover 6 may have an opening in the form of a notch in place of the recess 1410.

Figure 15:
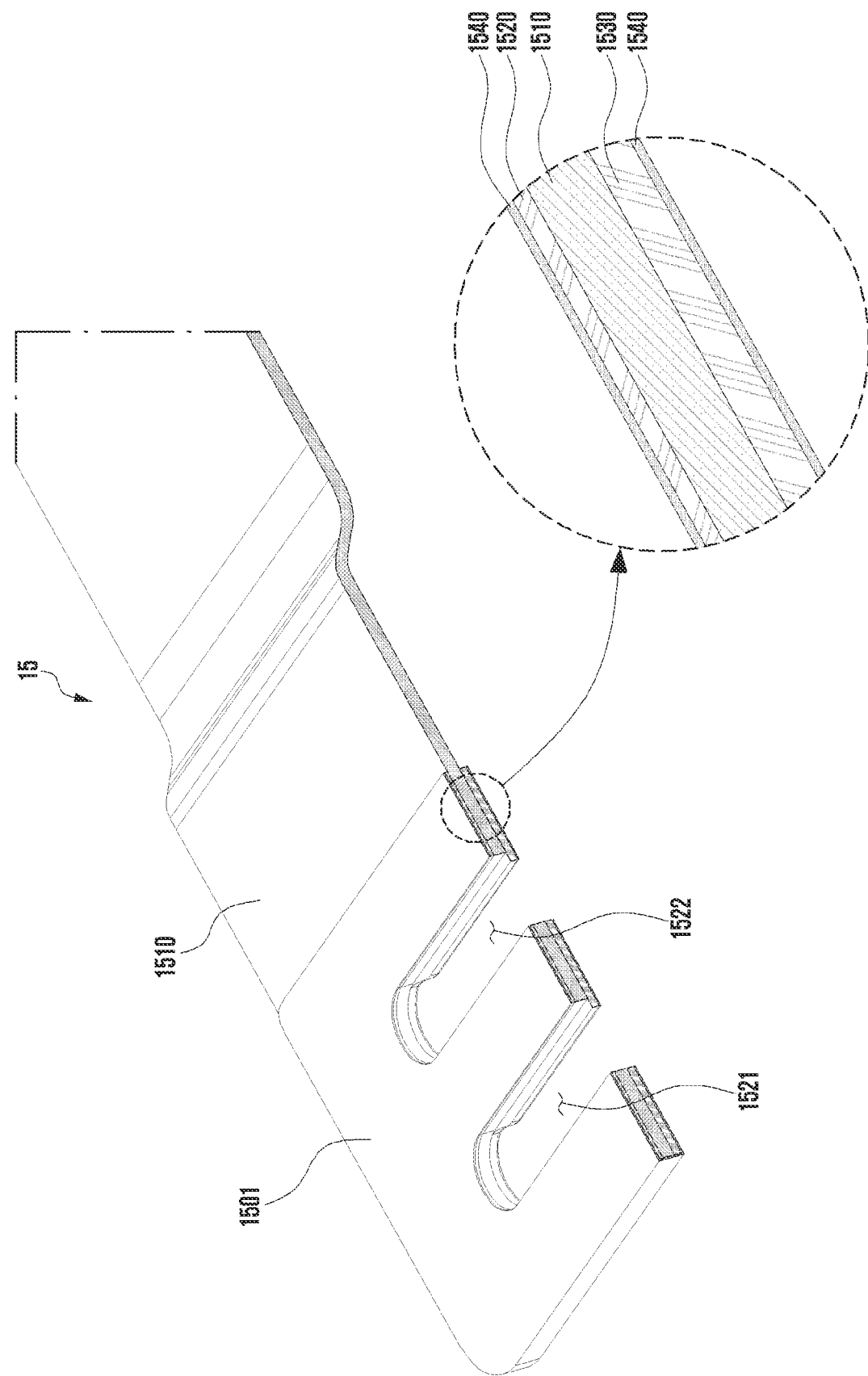
FIG. 15 is a partial cross-sectional view illustrating a strap according to various embodiments.

FIG. 15 is a partial cross-sectional view illustrating a strap 15 according to various embodiments.

With reference to FIG. 15, except for a different shape from the strap 7 of FIG. 11, the strap 15 may be provided in a manner similar or identical at least in part to the strap 7 of FIG. 11. The strap 15 may include, for example, a flexible sheet 1510 (e.g., the flexible sheet 1310 in FIG. 13), the first reinforcing plate 1520 (e.g., the first reinforcing plate 1320 in FIG. 13), the second reinforcing plate 1530 (e.g., the second reinforcing plate 1330 in FIG. 13), and/or the coating layer 1540 (e.g., the coating layer 1340 in FIG. 13). In an embodiment, a reinforced region 1501 included in the strap 15 may have a first opening 1521 and a second opening 1522, compared to the reinforced region 1103 shown in FIG. 11. Although not shown, the first cover 5 of FIG. 11 may be modified to include a first hook structure corresponding to the first opening 1521 and a second hook structure corresponding to the second opening 1522. In various embodiments, the number or position of the opening included in the reinforced region 1103 and the corresponding number or position of the hook structure of the first cover 5 may vary without being limited to the illustrated example.

Figure 16:
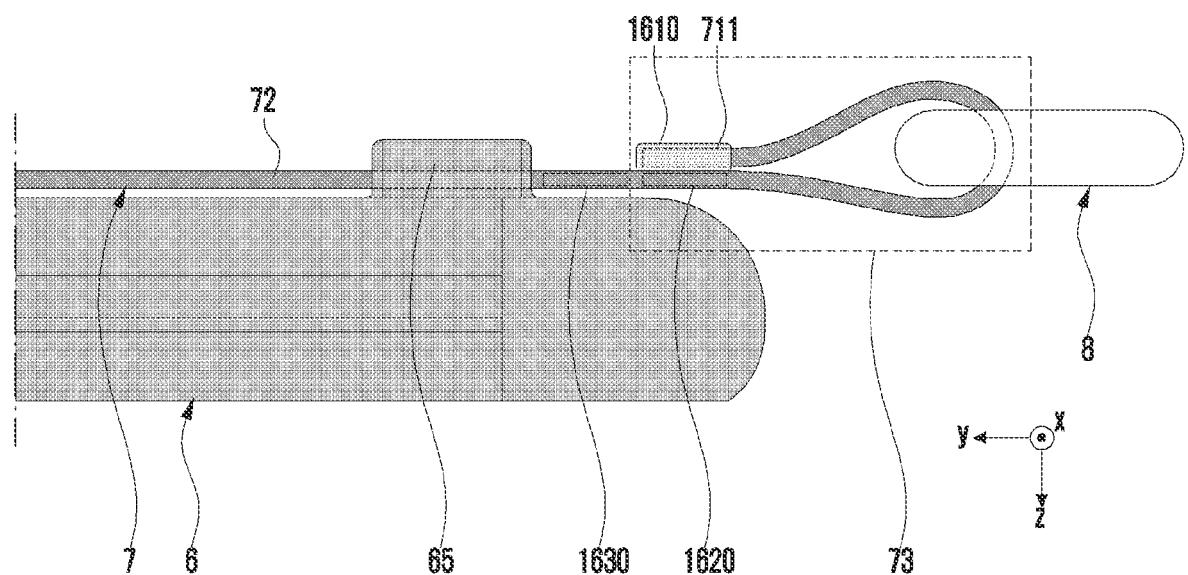
FIG. 16 is a diagram illustrating a second cover, a strap, and a connecting member according to various embodiments.
Figure 16:
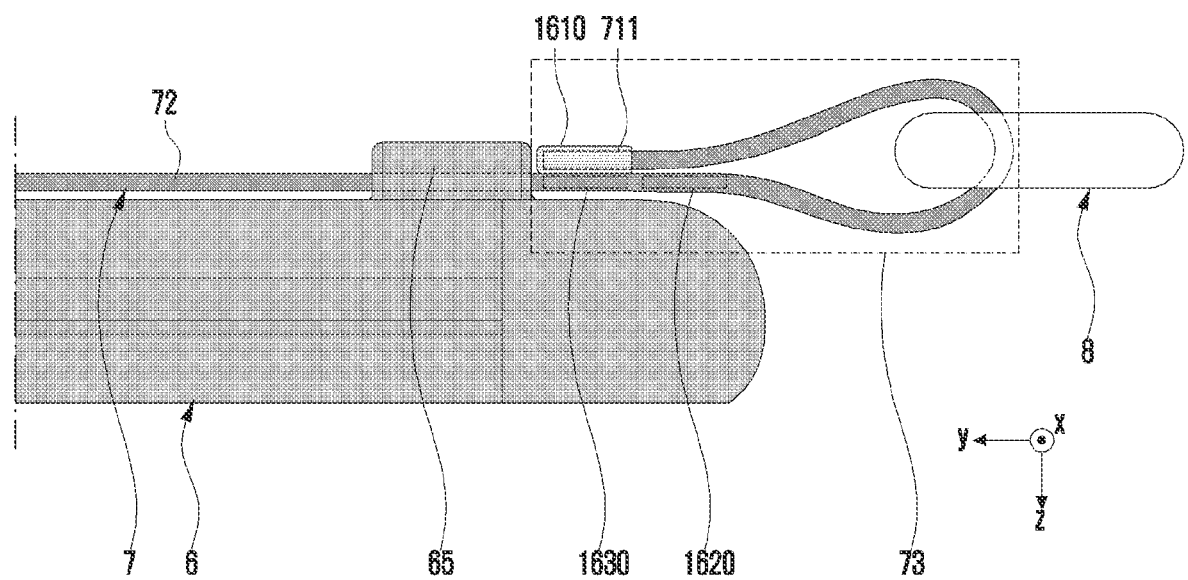

FIG. 16 is a diagram illustrating a second cover 6, a strap 7, and a connecting member 8 according to various embodiments.

With reference to FIG. 16, in an embodiment, the third portion 73 of the strap 7 may be provided in a loop shape by attaching one end 711 of the strap 7 to other point of the strap 7. The third portion 73 of the strap 7 may be positioned by passing through the connecting member 8. The size of the loop-shaped third portion 73 or the length of the second portion 72 may vary depending on the position where the one end 711 of the strap 7 is attached. For example, if the length providing the loop-shaped third portion 73 is increased, the length of the second portion 72 may be reduced. In an embodiment, the strap 7 may include a first magnet 1610 located at the one end 711, a second magnet 1620 located at a first position spaced apart from the one end 711 of the strap 7 by a first length, and a third magnet 1630 located at a second position spaced apart from the one end 711 of the strap 7 by a second length greater than the first length. The first magnet 1610 may be disposed on the outer surface of the strap 7. In various embodiments, the first magnet 1610 may be located at least partially inside the one end 711. The second magnet 1620 or the third magnet 1630 may be located inside the strap 7. In various embodiments, the second magnet 1620 or the third magnet 1630 may be disposed on the outer surface of the strap 7. The one end 711 may be attached to the first position of the strap 7 by an attractive force between the first and second magnets 1610 and 1620, or the one end 711 may be attached to the second position of the strap 7 by an attractive force between the first and third magnets 1610 and 1630. In case where the one end 711 is attached to the second position, compared to other case where the one end 711 is attached to the first position, the length of the loop-shaped third portion 73 of the strap 7 is further increased and the length of the second portion 72 of the strap 7 is further reduced.

Figure 17:
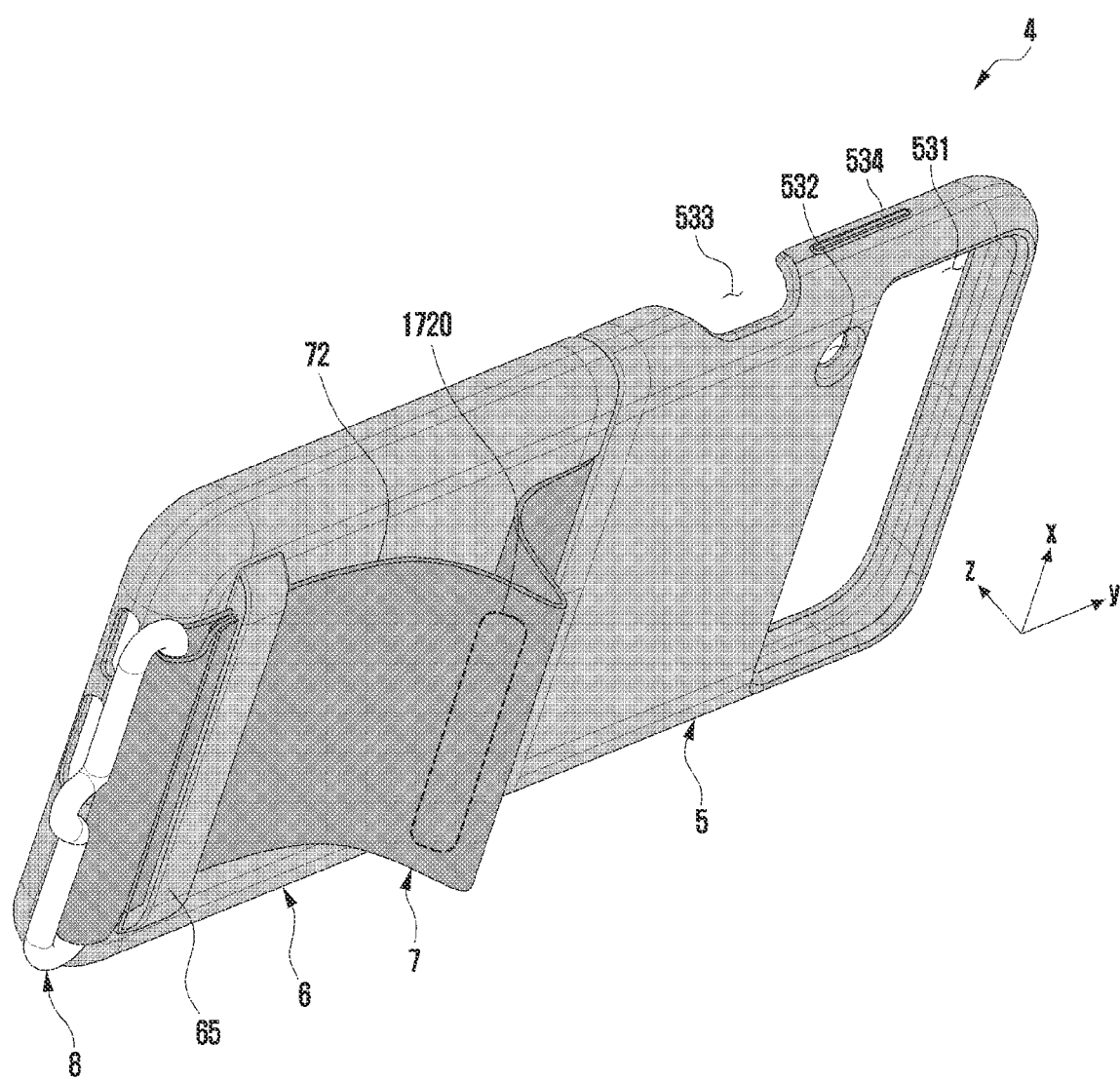
FIG. 17 is a perspective view of a cover according to various embodiments.
Figure 18:
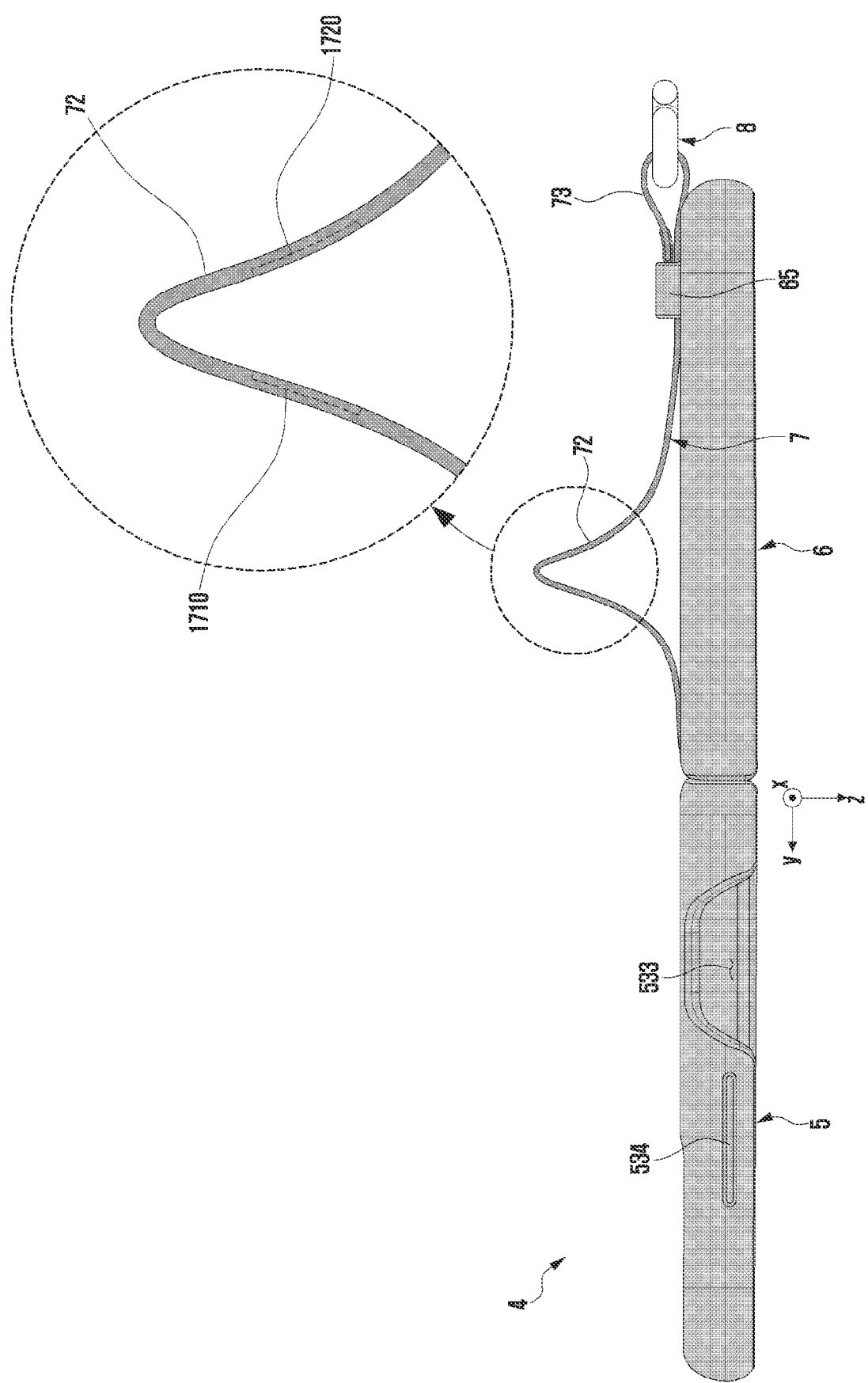
FIG. 18 is a diagram illustrating a cover, for example, in the embodiment of FIG. 17 according to various embodiments.

FIG. 17 is a perspective view of a cover 4 according to various embodiments. FIG. 18 is a diagram illustrating a cover 4, for example, in the embodiment of FIG. 17 according to various embodiments.

With reference to FIGS. 17 and 18, in an embodiment, the cover 4 may include the first cover 5, the second cover 6, the strap 7, and/or the connecting member 8. A redundant description of components described with reference to FIG. 4, 5, 6, or 7 and indicated by the same reference numerals may not be repeated here.

According to an embodiment, the strap 7 may include a first magnet 1710 and a second magnet 1720 disposed at different positions of the second portion 72. The third portion 73 of the strap 7 may be deformed into a folded form so that an attractive force between the first and second magnets 1710 and 1720 may act. The second portion 72 of the strap 7 may be maintained in the folded form by the attractive force between the first and second magnets 1710 and 1720, and the folded form of the second portion 72 may be used as a cradle or support for standing the electronic device 1 combined with the cover 4 on the floor.

According to an example embodiment of the disclosure, a cover (e.g., the cover 4 in FIG. 4) for a foldable electronic device (e.g., the electronic device 1 in FIG. 1) may include: a first cover (e.g., the first cover 5 in FIG. 4) and a second cover (e.g., the second cover 6 in FIG. 4). The first cover may include a first plate (e.g., the first bottom 51 in FIG. 4) and a first sidewall portion (e.g., the first side 52 in FIG. 4). The first plate may have a first surface (e.g., the first surface 51A in FIG. 10) and a second surface (e.g., the second surface 51B in FIG. 4) opposite to the first surface. The first sidewall portion may extend from an edge of the first plate. The first cover may have, based on the first plate and the first sidewall portion, a first recess allowing one part (e.g., the first housing 110 in FIG. 2) of the foldable electronic device with respect to a folding axis (e.g., the folding axis A in FIG. 4) of the foldable electronic device to be disposed therein. The second cover may include a second plate (e.g., the second bottom 61 in FIG. 4) and a second sidewall portion (e.g., the second side 62 in FIG. 4). The second plate may have a third surface (e.g., the third surface 61A in FIG. 10) and a fourth surface (e.g., the fourth surface 61B in FIG. 4) opposite to the third surface. The second sidewall portion may extend from an edge of the second plate. The second cover may have, based on the second plate and the second sidewall portion, a second recess allowing an other part (e.g., the second housing 120 in FIG. 2) of the foldable electronic device with respect to the folding axis to be disposed therein. The cover may include a strap (e.g., the strap 7 in FIG. 4) connecting the first cover and the second cover. The strap may include a first portion (e.g., the first portion 71 in FIG. 4) combined with the first surface. The strap may include a second portion (e.g., the second portion 72 in FIG. 4) extending from the first portion. The second portion may pass through an opening part (e.g., the opening structure 65 in FIG. 4) provided on the fourth surface opposite to the third surface.

According to an example embodiment of the disclosure, the second portion of the strap (e.g., the second portion 72 in FIG. 5) may be movable relative to the opening part (e.g., the opening structure 65 in FIG. 5) based on the cover (e.g., the cover 4 in FIG. 5) being combined with the foldable electronic device (e.g., the electronic device 1 in FIG. 5).

According to an example embodiment of the disclosure, the second portion of the strap (e.g., the second portion 72 in FIG. 5) may be movable relative to the opening part (e.g., the opening structure 65 in FIG. 5) where the foldable electronic device (e.g., the electronic device 1 in FIG. 5) is in an unfolding state based on the cover (e.g., the cover 4 in FIG. 5) being combined with the foldable electronic device.

According to an example embodiment of the disclosure, the first surface (e.g., the first surface 51A in FIG. 10) may include a recess (e.g., the recess 1001 in FIG. 10) in which the first portion of the strap (e.g., the first portion 71 in FIG. 10) is located.

According to an example embodiment of the disclosure, the first portion of the strap (e.g., the first portion 71 in FIG. 11) may be detachable from the first surface (e.g., the first surface 51A in FIG. 11).

According to an example embodiment of the disclosure, the first portion of the strap (e.g., the first portion 71 in FIG. 11) may include an opening (e.g., the opening 1102 in FIG. 11). The first cover (e.g., the first cover 5 in FIG. 11) may include a hook portion (e.g., the hook structure 1101 in FIG. 11) extending from the first surface (e.g., the first surface 51A in FIG. 11) and configured to be inserted in the opening.

According to an example embodiment of the disclosure, the strap (e.g., the strap 7 in FIG. 13) may include a reinforcing portion (e.g., the first reinforcing plate 1320 or the second reinforcing plate 1330 in FIG. 13) included in the first portion (e.g., the first portion 71 in FIG. 11).

According to an example embodiment of the disclosure, the cover (e.g., the cover 4 in FIG. 10) may further include an adhesive positioned between the first surface (e.g., the first surface 51A in FIG. 10) and the first portion of the strap (e.g., the first portion 71 in FIG. 10).

According to an example embodiment of the disclosure, the opening part (e.g., the opening structure 65 in FIG. 4)

may include a third portion (e.g., the first structure part 651 in FIG. 4), a fourth portion (e.g., the second structure part 652 in FIG. 4), and a fifth portion (e.g., the third structure part 653 in FIG. 4). The third portion may be connected to a first area of the fourth surface (e.g., the fourth surface 61B in FIG. 4). The fourth portion may be connected to a second area of the fourth surface. The fifth portion may connect the third portion and the fourth portion and be positioned to be spaced apart from a third area of the fourth surface between the first and second areas. The opening part may have an opening formed by the third portion, the fourth portion, the fifth portion, and the third area. The second portion of the strap (e.g., the second portion 72 in FIG. 4) may pass through the opening.

According to an example embodiment of the disclosure, based on the cover (e.g., the cover 4 in FIG. 4) being combined with the foldable electronic device (e.g., the electronic device 1 in FIG. 4), the first cover (e.g., the first cover 5 in FIG. 4) may include a first edge (e.g., the first edge E1 in FIG. 4) positioned to correspond to the folding axis (e.g., the folding axis A in FIG. 4), and the second cover (e.g., the second cover 6 in FIG. 4) may include a second edge (e.g., the second edge E2 in FIG. 4) positioned to correspond to the folding axis. The second portion of the strap (e.g., the second portion 72 in FIG. 4) may extend from the first portion between the first edge and the second edge.

According to an example embodiment of the disclosure, a part of the second portion of the strap (e.g., the second portion 72 in FIG. 13) adjacent to the second edge (e.g., the second edge E2 in FIG. 13) may be disposed in a recess (e.g., the recess 1310 in FIG. 13) provided in the fourth surface (e.g., the fourth surface 61B in FIG. 13) adjacent to the second edge based on the cover (e.g., the cover 4 in FIG. 4) being combined with the foldable electronic device (e.g., the electronic device 1 in FIG. 4).

According to an example embodiment of the disclosure, where the foldable electronic device (e.g., the electronic device 1 in FIG. 4) is in a folded state based on the cover (e.g., the cover 4 in FIG. 4) being combined with the foldable electronic device, a hinge cover (e.g., the hinge cover 130 in FIG. 6 or 7) of the foldable electronic device may be exposed in part to outside through between the first edge (e.g., the first edge E1 in FIG. 7) and the second edge (e.g., the second edge E2 in FIG. 6) and covered at least in part by the second portion of the strap (e.g., the second portion 72 in FIG. 6 or 7).

According to an example embodiment of the disclosure, the cover (e.g., the cover 4 in FIG. 10) may further include a flexible sheet (e.g., the first sheet 1010 in FIG. 10) disposed on an area of the first surface (e.g., the first surface 51A in FIG. 10) different from an area combined with the first portion (e.g., the first portion 71 in FIG. 10).

According to an example embodiment of the disclosure, the cover (e.g., the cover 4 in FIG. 10) may further include a flexible sheet (e.g., the second sheet 1020 in FIG. 10) disposed on the third surface (e.g., the third surface 61B in FIG. 10).

According to an example embodiment of the disclosure, the strap (e.g., the strap 7 in FIG. 4) may further include a third portion (e.g., the third portion 73 in FIG. 4) extending from the second portion of the strap (e.g., the second portion 72 in FIG. 4). The third portion may be provided so as not to pass through the opening part (e.g., the opening structure 65 in FIG. 4) and so as not to disengage from the second portion of the strap for the second cover (e.g., the second cover 6 in FIG. 4).

According to an example embodiment of the disclosure, the third portion of the strap (e.g., the third portion 73 in FIG. 15) may be provided in a loop form wherein one end (e.g., the one end 711 in FIG. 15) of the strap is attached to another point of the strap.

According to an example embodiment of the disclosure, the third portion of the strap (e.g., the third portion 73 in FIG. 15) may further include a first magnet (e.g., the first magnet 1510 in FIG. 15), a second magnet (e.g., the second magnet 1520 in FIG. 15), and a third magnet (e.g., the third magnet 1530 in FIG. 15). The first magnet may be disposed at one end (e.g., the one end 711 in FIG. 15) of the strap. The second magnet may be disposed at a first position of the strap spaced apart from the one end by a first length. The third magnet may be disposed at a second position of the strap spaced apart from the one end by a second length greater than the first length. The one end of the strap may be attached to the first position by an attractive force between the first and second magnets, or attached to the second position by an attractive force between the first and third magnets.

According to an example embodiment of the disclosure, the cover (e.g., the cover 4 in FIG. 4) may further include a connecting part (e.g., the connecting member 8 in FIG. 4) connected to the third portion of the strap (e.g., the third portion 73 in FIG. 4) and configured to connect an external body (or external member or external device) (e.g., another strap 9 in FIG. 9).

According to an example embodiment of the disclosure, the cover (e.g., the cover 4 in FIG. 17) may further include a first magnet (e.g., the first magnet 1610 in FIG. 17) and a second magnet (e.g., the second magnet 1620 in FIG. 17) disposed at different positions of the second portion of the strap (e.g., the second portion 72 in FIG. 17). The second portion of the strap may be maintained in a folded form by an attractive force between the first magnet and the second magnet.

According to an example embodiment of the disclosure, the strap (e.g., the strap 7 in FIG. 4) may include fabric, polymer, or leather.

While the disclosure has been illustrated and described with reference to various example embodiments, it will be understood that the various example embodiments are intended to be illustrative, not limiting. Accordingly, one skilled in the art will understand that various changes in form an detail are included in the scope of the disclosure in addition to the various example embodiments disclosed herein. It will also be understood that any of the embodiment(s) described herein may be used in conjunction with any other embodiment(s) described herein.

What is claimed is:

1. A cover for a foldable electronic device, the foldable electronic device including a first housing, a second housing, and a hinge portion that rotatably connects the first housing and the second housing, the cover comprising:
   a first cover configured for accommodating the first housing of the foldable electronic device, including:
   a first plate and a first sidewall portion extending from an edge of the first plate;
   a second cover configured for accommodating the second housing of the foldable electronic device, including:
   a second plate and a second sidewall portion extending from an edge of the second plate; and
   a strap configured for connecting the first cover and the second cover, the strap including:
- a first portion combined with the first cover, and
- a second portion extended from the first portion and combinable with the second cover by passing through an opening part formed on the second cover, wherein the second portion is in a movable state relative to the opening part.

2. The cover of claim 1, wherein the second portion of the strap is movable relative to the opening part when the cover is combined with the foldable electronic device.

3. The cover of claim 2, wherein the second portion of the strap is movable relative to the opening part when the cover is combined with the foldable electronic device in an unfolded state.

4. The cover of claim 1, wherein:
the first plate of the first cover includes a first surface and a second surface opposite to the first surface, the first surface facing the first housing when the cover is combined with the foldable electronic device,
the first surface of the first plate includes a recess in which the first portion of the strap is located.

5. The cover of claim 4, wherein the first portion of the strap is detachable from the first surface of the first cover.

6. The cover of claim 4, wherein the first portion of the strap includes an opening, and
wherein the first cover includes a hook portion extending from the first surface of the first cover and configured to be inserted and positioned in the opening.

7. The cover of claim 4, further comprising:
an adhesive material positioned between the first surface of the first cover and the first portion of the strap.

8. The cover of claim 4, further comprising:
a flexible sheet disposed on an area of the first surface of the first cover different from an area combined with the first portion of the strap.

9. The cover of claim 1, wherein the strap includes a reinforcing portion included in the first portion of the strap.

10. The cover of claim 1,
wherein the second plate of the second cover includes a third surface and a fourth surface opposite to the third surface, the third surface facing the second housing when the cover is combined with the foldable electronic device,
wherein the opening part includes:
a third portion connected to a first area of the fourth surface of the second cover, a fourth portion connected to a second area of the fourth surface of the second cover, and a fifth portion connecting the third portion and the fourth portion and positioned to be spaced apart from a third area of the fourth surface of the second cover between the first and second areas, and
an opening formed by the third portion, the fourth portion, the fifth portion, and the third area, and
wherein the second portion of the strap is configured to pass through the opening.

11. The cover of claim 10, further comprising:
a flexible sheet disposed on the third surface of the second cover.

12. The cover of claim 1, wherein when the cover is combined with the foldable electronic device, a first edge of the first cover is disposed at a first position corresponding to a folding axis of the foldable electronic device, a second edge of the second cover is disposed at a second position corresponding to the folding axis, and a part of the second portion of the strap extends across the folding axis between the first edge and the second edge, and
wherein when the cover is combined with the foldable electronic device in a folded state, a part of the second portion of the strap at least partially covers a hinge cover of the hinge portion.

13. The cover of claim 12, wherein a part of the second portion of the strap adjacent to the second edge is disposed in a recess provided on the fourth surface of the second cover adjacent to the second edge based on the cover being combined with the foldable electronic device.

14. The cover of claim 1, wherein when the cover is combined with the foldable electronic device in a folded state, a part of the second portion covers the hinge portion of the foldable electronic device.

15. The cover of claim 1, wherein the strap further includes a third portion extending from the second portion, and
wherein the third portion is provided so as not to pass through the opening part and to not to disengage the second cover from the second portion of the strap.

16. The cover of claim 15, wherein the third portion of the strap is provided in a loop form by attaching one end of the strap to another point of the strap.

17. The cover of claim 16, wherein the third portion of the strap further includes:
a first magnet disposed at one end of the strap;
a second magnet disposed at a first position of the strap spaced apart from the one end by a first length; and
a third magnet disposed at a second position of the strap spaced apart from the one end by a second length greater than the first length, and
wherein the one end of the strap is attached to the first position by an attractive force between the first and second magnets, or attached to the second position by an attractive force between the first and third magnets.

18. The cover of claim 15, further comprising:
a connecting part connected to the third portion and configured to connect to an external body.

19. The cover of claim 1, further comprising:
a first magnet and a second magnet are disposed at different positions of the second portion,
wherein the second portion of the strap is configured to be maintained in a folded form by an attractive force between the first magnet and the second magnet.

20. The cover of claim 1, wherein the strap comprises fabric, polymer, or leather.

* * * * *